(12) United States Patent
Kochetkov et al.

(10) Patent No.: US 9,215,165 B2
(45) Date of Patent: Dec. 15, 2015

(54) LINK AGGREGATION SYSTEM, PROTECTION SYSTEM, AND CROSS POLARIZATION INTERFERENCE CANCELLATION APPLICATIONS FOR ALL OUTDOOR RADIOS USING WIRELESS CHANNELS OPERATING AT A LICENSING-FREE 60 GHZ BAND

(75) Inventors: Andrey Kochetkov, Cary, NC (US); Ying Shen, Chapel Hill, NC (US); Thanh H. Nguyen, Cary, NC (US)

(73) Assignee: ZTE (USA) INC., Austin, TX (US)

( * ) Notice: Subject to any disclaimer, the term of this patent is extended or adjusted under 35 U.S.C. 154(b) by 4 days.

(21) Appl. No.: 14/233,479

(22) PCT Filed: Jul. 20, 2012

(86) PCT No.: PCT/US2012/047591
§ 371 (c)(1),
(2), (4) Date: Jan. 17, 2014

(87) PCT Pub. No.: WO2013/013145
PCT Pub. Date: Jan. 24, 2013

(65) Prior Publication Data
US 2014/0177690 A1    Jun. 26, 2014

Related U.S. Application Data

(60) Provisional application No. 61/509,758, filed on Jul. 20, 2011, provisional application No. 61/512,824, filed on Jul. 28, 2011, provisional application No. 61/514,147, filed on Aug. 2, 2011.

(51) Int. Cl.
| | |
|---|---|
| *H04B 1/38* | (2015.01) |
| *H04L 5/16* | (2006.01) |
| *H04L 12/709* | (2013.01) |
| *H04W 84/12* | (2009.01) |
| *H04L 1/06* | (2006.01) |
| *H04L 29/06* | (2006.01) |
| *H04L 12/931* | (2013.01) |
| *H04L 5/00* | (2006.01) |
| *H04W 72/00* | (2009.01) |
| *H04B 7/10* | (2006.01) |

(52) U.S. Cl.
CPC ............ *H04L 45/245* (2013.01); *H04L 1/06* (2013.01); *H04L 49/352* (2013.01); *H04L 69/14* (2013.01); *H04W 84/12* (2013.01); *H04B 7/10* (2013.01); *H04L 5/001* (2013.01); *H04W 72/00* (2013.01)

(58) Field of Classification Search
CPC .... H04L 45/245; H04L 49/352; H04W 84/12
USPC ......................................................... 375/222
See application file for complete search history.

(56) References Cited

U.S. PATENT DOCUMENTS

| | | | |
|---|---|---|---|
| 2009/0156133 A1 | 6/2009 | Rofougaran et al. | |
| 2011/0040888 A1 | 2/2011 | Krishnaswamy et al. | |
| 2011/0045767 A1 | 2/2011 | Rofougaran et al. | |
| 2013/0204962 A1* | 8/2013 | Estevez et al. | 709/217 |

OTHER PUBLICATIONS

ZTE (USA) Inc., International Search Report and Written Opinion, PCT/US2012/047591, Jan. 21, 2013, 9 pgs.

\* cited by examiner

*Primary Examiner* — Nader Bolourchi
(74) *Attorney, Agent, or Firm* — Morgan, Lewis & Bockius LLP

(57) ABSTRACT

System and method for implementing a link aggregation system, a protection system, and an XPIC application for an all outdoor radios system using a wireless channel operating at a license-free 60 GHz band are provided. The license-free 60 GHz band offers a wide frequency bandwidth that can support a high speed data rate up to 10 Gbps in full duplex mode, frequency reuse, and high security due to its fast oxygen absorption at 60 GHz. As such, a wireless channel operating at the license-free 60 GHz band may be used for a link aggregation system to support wireless local area network (LAN) connections with the speed up to 7 Gbps. In addition, a wireless connection operating at the license-free 60 GHz band may be used to support both XPIC application and protection system for all outdoor radios to achieve a transmission speed of up to 10 Gbps in a full duplex mode.

18 Claims, 25 Drawing Sheets

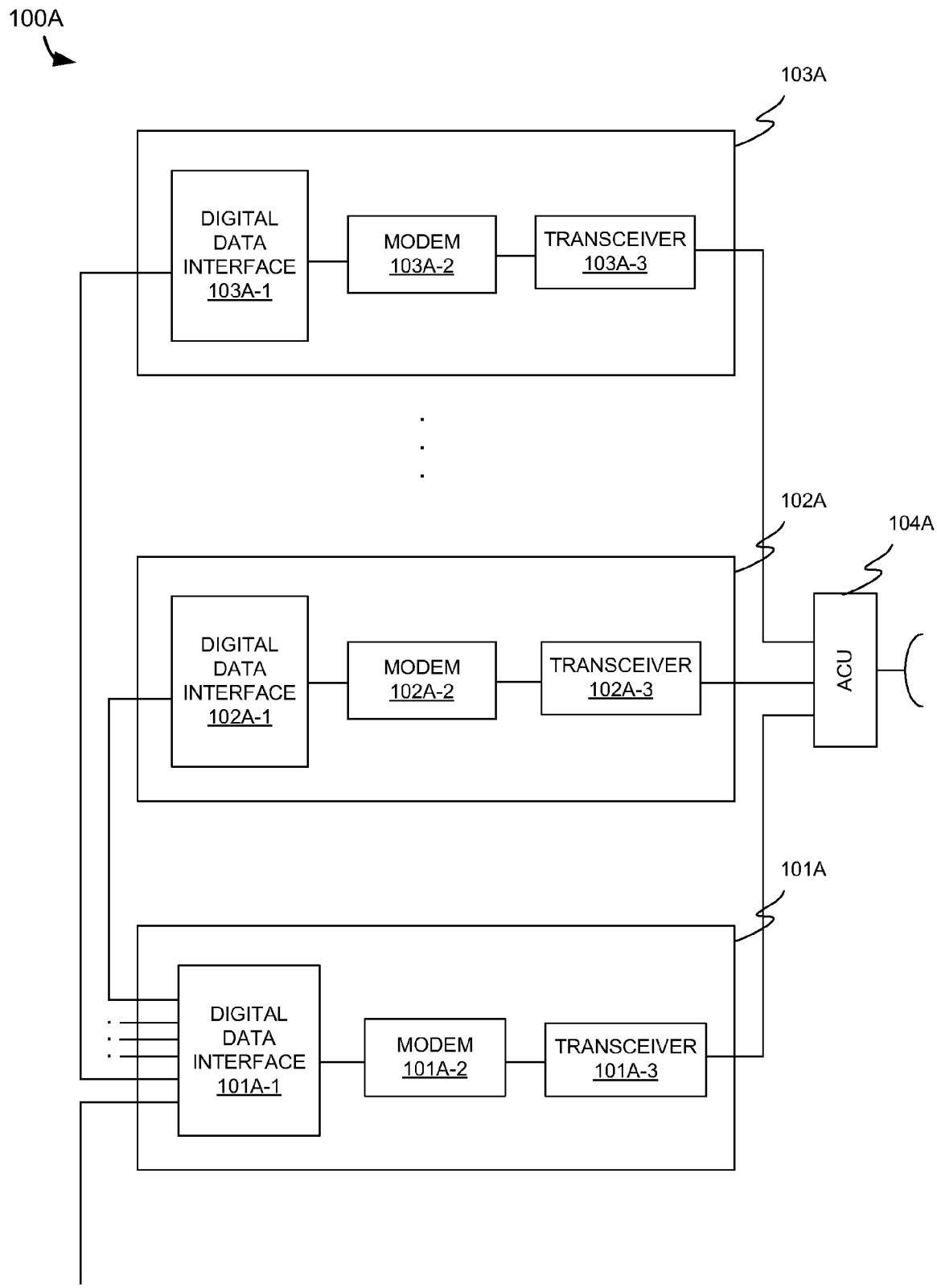
FIG. 1A (*RELATED ART*)

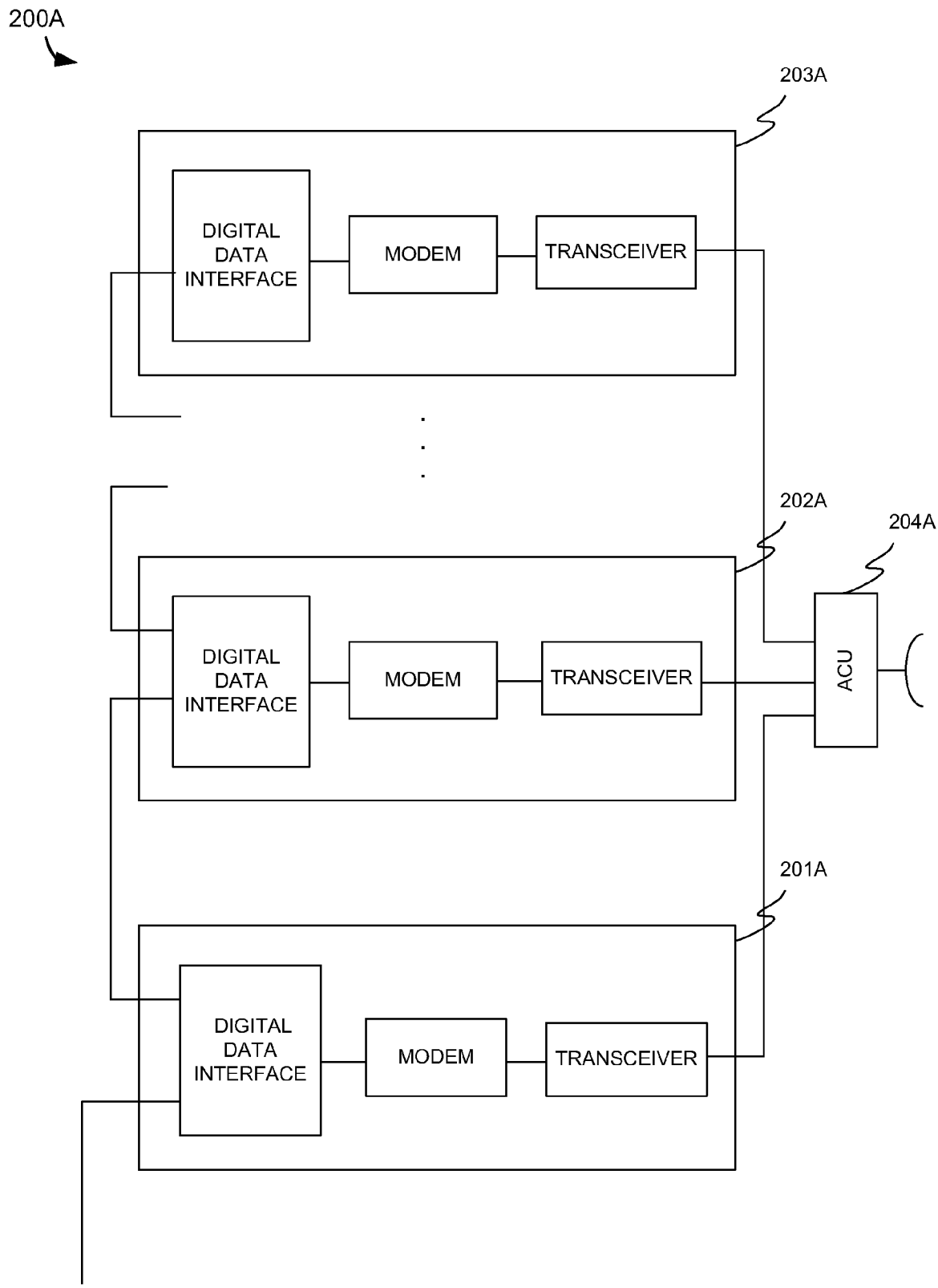
FIG. 1B (*RELATED ART*)

LINK AGGREGATION SYSTEM, PROTECTION SYSTEM, AND CROSS POLARIZATION INTERFERENCE CANCELLATION APPLICATIONS FOR ALL OUTDOOR RADIOS USING WIRELESS CHANNELS OPERATING AT A LICENSING-FREE 60 GHZ BAND

CROSS REFERENCE TO RELATED APPLICATIONS

This Application is a United States National Stage Application filed under 35 U.S.C. §371 of PCT Patent Application Serial No. PCT/US2012/047591 filed on Jul. 20, 2012, which claims the benefit of and priority to U.S. Provisional Patent Application No. 61/509,758 filed on Jul. 20, 2011, U.S. Provisional Patent Application No. 61/512,824 filed on Jul. 28, 2011, and U.S. Provisional Patent Application No. 61/514,147 filed on Aug. 2, 2011, which are hereby incorporated by reference in their entireties.

FIELD OF INVENTION

The present invention relates generally to the field of all outdoor radios equipment used for wireless communication, and in particular, to the field of implementing a link aggregation system, a protection system, or a cross polarization interference cancellation (XPIC) application for all outdoor radios using wireless channels operating at a license-free 60 GHz band.

BACKGROUND

The required capacity of backhaul networks grows exponentially in recent years. While copper or fiber optic based wired systems can provide data throughput of 10 Gbps or more, the microwave radio channel throughput of traditional frequency bands between 6 and 42 GHz is currently 500 Mbps or less. In order to increase the data throughput of wireless communication, link aggregation schemes are used where two or more microwave radios are connected in parallel as shown in FIG. 1A.

FIG. 1A is an exemplary illustration of an all outdoor radios link aggregation system 100A with a star-like wired connection. High-speed data traffic (which is typically in Ethernet format but could be in any other digital format) is connected to a first radio unit 101A. The digital data interface module 101A-1 in the first radio unit 101A splits the incoming data into two or more data streams. Each data stream has a data rate that is equal to or less than the throughput of a single microwave radio. One data stream is transmitted by the first radio unit 101A. The other data streams are connected to the other radios such as a second radio unit 102A and a third radio unit 103A in the link aggregation system using high-speed digital cables (which are typically Ethernet cable but could be any other digital cable). Different radio units transmit data streams using different carrier frequencies. On the local side, the output Radio Frequency (RF) signal of each transceiver (101A-3, 102A-3, and 103A-3) is transmitted to an antenna coupling unit (ACU) 104, which combines them together and transmits the combined data streams to an antenna and subsequently into the air. The ACU 104 is a passive device that allows multiple transmitters to be connected to the same antenna. On the remote side, the received RF signal is delivered to a corresponding ACU that is configured to transmit the received RF signal to multiple receivers.

Note that the equipment on the remote side has the same configuration as the one shown in FIG. 1A except that the ACUs are located on the left side and the digital data interfaces are on the right side. Different radio units are tuned on different carrier frequencies to receive one data stream. The digital data streams from some radios are connected to the digital data interface of the first radio, which combines them together to reconstruct the original data traffic and sends the data traffic to the user's equipment. In this configuration, the first radio unit 101A (i.e., the master radio) has multiple weatherproof connectors on its enclosure, each weatherproof connector used for connecting to another radio unit in the link aggregation system. This increases the size of the all outdoor radio enclosure. Because the other radio units are usually of the same type as the first radio unit 101A, all the other radio units will have extra outdoor connectors that are not used at the same time. Further, the installation and maintenance of multiple outdoor-rated high-speed cables between the radio units in the link aggregation system is difficult and expensive.

FIG. 1B illustrates an alternative, currently used approach of having multiple radio daisy-chained. In this daisy-chain approach, each all outdoor radio unit splits the incoming data into two data streams: one data stream to be transmitted by the radio unit itself and having a data rate equal to or less than the throughput of the radio unit, and the second data stream, which contains the remaining data, is forwarded to the next radio unit in the chain. Using this daisy-chain approach, each all outdoor radio unit only needs one extra connector. But this daisy-chain approach causes more latency because the overall latency is determined by the longest path in the link aggregation system.

In addition, wireless communication in current radio backhaul networks may be affected and deteriorated for various reasons, for example, multipath interference, hardware failure, selective path fading etc. In order to protect the wireless communication against these factors, microwave radio units may often be deployed in a one plus one (1+1) protection mode such as hot standby configuration, space diversity configuration, frequency diversity configuration, or hybrid diversity configuration. The radio units that participate in the protection configuration need to exchange data and signaling information to ensure proper operation.

Currently, all outdoor radios protection system may employ a high speed digital wired connection to exchange information between the radio units. The transmission speed of the digital wired connection may be up to 1 Gigabits per second (Gbps) in full duplex mode.

FIG. 1C illustrates an exemplary illustration of an all outdoor radios protection system 100B using a wired connection in related art. As illustrated in FIG. 1C, a first radio unit 101B and a second radio unit 102B are deployed in the protection configuration. A first protection interface 108B of the first radio unit 101B and a second protection interface 115B of the second radio unit 102B are connected by an outdoor digital cable with a transmission speed up to 1 Gbps in full duplex mode.

Finally, an XPIC application is often employed in current radio backhaul networks to improve the capacity of a radio frequency (RF) channel, which effectively doubles the capacity of an RF channel by allowing two microwave radio units to operate on the same frequency. One radio unit uses the vertical polarization while the other radio unit uses the horizontal polarization. Demodulator in each radio unit of the XPIC application receives, respectively, intermediate frequency (IF) signals from a local receiver and from the receiver of the other radio unit operating an opposite polarization. Demodulator uses the IF signal from the other radio to cancel the interference from the opposite polarization in the IF signal from the local receiver caused by limited antenna cross polarization discrimination.

FIG. 1D is an exemplary illustration of an all outdoor radios system implemented with an XPIC application using a wired connection in related art. As illustrated in FIG. 1D, a first radio unit 101C is configured to operate using the vertical polarization, and a second radio unit 102C is configured to operate using the horizontal polarization. A first demodulator 105C of the first radio unit 101C uses the IF signal 116C from the second radio unit 102C to cancel the interference from the horizontal polarization in the IF signal 115C from the first radio unit 101C.

When an XPIC application in combination with a protection system is employed in an all outdoor radios system, a total of six wired connections between the four radio units are required. FIG. 1E is an exemplary illustration of an all outdoor radios system equipped with a protection system and an XPIC application using a wired connection in related art. As illustrated in FIG. 1E, there are two wired XPIC interconnections 233C, 234 between a first radio unit 201C and a second radio unit 202C, two wired XPIC interconnections 237C, 238C between a third radio unit 203C and a fourth radio unit 204C, one wired protection interconnection 235C between the first radio unit 201C and the third radio unit 203C, and one wired protection interconnection 236C between the second radio unit 202C and the fourth radio unit 204C are required.

However, the wired XPIC and protection connections require both the weatherproof connectors on the enclosure of the all outdoor radio units and the outdoor rated digital cables. Due to the sizes of the antennas at certain frequency bands, the installation and maintenance of the XPIC pair of the all outdoor radio units may be difficult and expensive.

SUMMARY

In accordance with some embodiments of the present invention, a system and method for implementing an all outdoor radio link aggregation system uses a wireless channel operating at a license-free 60 GHz band that substantially obviates one or more problems due to the limitations and disadvantages of the related art.

The license-free 60 GHz band offers at least the following key benefits: (i) a wide frequency bandwidth that can support a very high speed data rate ranging from 1 Gbps up to 10 Gbps in full duplex mode, (ii) frequency reuse, and (iii) high security due to its fast oxygen absorption at 60 GHz. A wireless connection operating at the license-free 60 GHz band may be used for an all outdoor radios link aggregation system to support wireless local area network (LAN) connections with the speed up to 7 Gbps, which is sufficient for the link aggregation system including up to seven microwave radio units, assuming each radio has a 500 Mbps throughput. Moreover, the replacement of the conventional wired link aggregation approach with the high data rate of the license-free 60 GHz wireless connection eliminates the high-speed outdoor-rated protection cables between radio units and the multiple weatherproof connectors for cables on the all outdoor radio units. For example, an all outdoor radio unit optimized for low latency star-like configuration needs only one connector for a 60 GHz antenna. Further, the radio installation is simplified and the maintenance cost is reduced.

In an embodiment, a method is provided for implementing an all outdoor radios link aggregation system using a wireless channel operating at a license-free 60 GHz band, the method comprising the steps of: receiving an upstream user data at a first digital data interface of a first radio unit; splitting the upstream user data into at least a first sub-stream digital data and a second sub-stream digital data at the first digital data interface; transmitting the first sub-stream digital data through a first rear-end modem and a first rear-end transceiver of the first radio unit; transmitting the second sub-stream digital data to a first wireless controller of the first radio unit; encapsulating the second sub-stream digital data into a second sub-stream data packet addressed to a first destination radio unit at the first wireless controller, and transmitting the second sub-stream data packet to a first front-end modem of the first radio unit; converting the second sub-stream data packet into a first downstream data intermediate frequency (IF) signal at the first front-end modem, and transmitting the first downstream data IF signal to a first front-end transceiver of the first radio unit; converting the first downstream data IF signal into a first 60 GHz radio frequency (RF) signal, and amplifying the first 60 GHz RF signal at the first front-end transceiver; transmitting the first 60 GHz RF signal at a first 60 GHz antenna of the first radio unit; receiving the first 60 GHz RF signal at a second 60 GHz antenna of a second radio unit; amplifying the first 60 GHz RF signal, and converting the first 60 GHz RF signal into a second upstream data IF signal at a second front-end transceiver of the second radio unit, and transmitting the second upstream data IF signal to a second front-end modem of the second radio unit; converting the second upstream data IF signal into a second upstream data packet, and transmitting the second upstream data packet to a second wireless controller of the second radio unit; decapsulating the second upstream data packet at the second wireless controller, accepting the second upstream data packet if the second radio unit is the addressed first destination radio unit, and converting the second upstream data packet into a second upstream digital data; transmitting the second upstream digital data to a second digital data interface of the second radio unit; and transmitting the second upstream digital data through a second rear-end modem and a second rear-end transceiver of the second radio unit.

In a further embodiment, a method is provided for implementing an all outdoor radios link aggregation system using a wireless channel operating at a license-free 60 GHz band, the method comprising the steps of: receiving at least a third sub-stream digital data at the first digital data interface and a fourth sub-stream digital data at the second digital data interface; transmitting the fourth sub-stream digital data to the second wireless controller; encapsulating the fourth sub-stream digital data into a fourth sub-stream data packet addressed to a second destination radio unit at the second wireless controller, and transmitting the fourth sub-stream data packet to the second front-end modem; converting the fourth sub-stream data packet into a second downstream data IF signal at the second front-end modem, and transmitting the second downstream data IF signal to the second front-end transceiver; converting the second downstream data IF signal into a second 60 GHz radio RF signal, and amplifying the second 60 GHz RF signal at the second front-end transceiver; transmitting the second 60 GHz RF signal at the second 60 GHz antenna; receiving the second 60 GHz RF signal at the first 60 GHz antenna; amplifying the second 60 GHz RF signal, and converting the second 60 GHz RF signal into a first upstream data IF signal at the first front-end transceiver, and transmitting the first upstream data IF signal to the first front-end modem; converting the first upstream data IF signal into a first upstream data packet, and transmitting the first upstream data packet to the first wireless controller; decapsulating the first upstream data packet, accepting the first upstream data packet if the first radio unit is the addressed second destination radio unit, and converting the first upstream data packet into a first upstream digital data; transmitting the first upstream digital data to the first digital data interface; and aggregating the first upstream digital data and the third sub-stream digital data, reconstructing a first downstream user data, and transmitting the first downstream user data.

In yet another embodiment, the first sub-stream digital data is configured with a data rate equal to or less than the throughput of the first radio unit and the second sub-stream digital data is configured with a data rate equal to or less than the throughput of the second radio unit.

In yet another embodiment, the third sub-stream digital data is configured with a data rate equal to or less than the throughput of the first radio unit and the fourth sub-stream digital data is configured with a data rate equal to or less than the throughput of the second radio unit.

In yet another embodiment, the first radio unit and the second radio unit are configured to operate at the license-free 60 GHz band.

In yet another embodiment, the first radio unit and the second radio unit are configured to connect in parallel to an ACU.

In yet a further embodiment, provided is an all outdoor radios link aggregation system using a wireless channel operating at a license-free 60 GHz band, the system comprising: a first radio unit including: a first digital data interface configured to receive an upstream digital data, and split the upstream digital data into at least a first sub-stream digital data and a second sub-stream digital data; a first rear-end modem configured to receive the first sub-stream digital data, and transmit the first sub-stream digital data to a first rear-end transceiver; a first digital wireless controller configured to receive the second sub-stream digital data, encapsulate the second sub-stream digital data into a second sub-stream data packet addressed to a first destination radio unit; a first front-end modem configured to convert the second sub-stream data packet into a first downstream data intermediate frequency (IF) signal; a first front-end transceiver configured to convert the first downstream data IF signal into a first 60 GHz radio frequency (RF) signal, and amplify the first 60 GHz RF signal; and a first 60 GHz antenna configured to transmit the first 60 GHz RF signal; at least a second radio unit including: a second 60 GHz antenna configured to receive the first 60 GHz RF signal; a second front-end transceiver configured to amplify the first 60 GHz RF signal, and convert the first 60 GHz RF signal into a second upstream data IF signal; a second front-end modem configured to convert the second upstream data IF signal into a second upstream data packet; a second wireless controller configured to decapsulate the second upstream data packet, accept the second upstream data packet if the second radio unit is the addressed first destination radio unit, and convert the second upstream data packet into a second upstream digital data; a second digital data interface configured to receive the second upstream digital data; and a second rear-end modem and a second rear-end transceiver configured to transmit the second upstream digital data.

In yet another embodiment, provided is an all outdoor radios link aggregation system using a wireless channel operating at a license-free 60 GHz band, wherein the first digital data interface is further configured to receive a third sub-stream digital data; the second digital data interface is further configured to receive a fourth sub-stream digital data; the second wireless controller is further configured to encapsulate the fourth sub-stream digital data into a fourth sub-stream data packet addressed to a second destination radio unit; the second front-end modem is further configured to convert the fourth sub-stream data packet into a second downstream data IF signal; the second front-end transceiver is further configured to convert the second downstream data IF signal into a second 60 GHz radio RF signal, and amplify the second 60 GHz RF signal; the second 60 GHz antenna is further configured to transmit the second 60 GHz RF signal; the first 60 GHz antenna is further configured to receive the second 60 GHz RF signal; the first front-end transceiver is further configured to amplify the second 60 GHz RF signal, and convert the second 60 GHz RF signal into a first upstream data IF signal; the first front-end modem is further configured to convert the first upstream data IF signal into a first upstream data packet; the first wireless controller is further configured to decapsulate the first upstream data packet, accept the first upstream data packet if the first radio unit is the addressed second destination radio unit, and convert the first upstream data packet into a first upstream digital data; the first digital data interface is further configured to receive the first upstream digital data, aggregate the first upstream digital data and the third sub-stream digital data, reconstruct a first downstream user data, and transmit the first downstream user data.

In accordance with some embodiments of the present invention, a system and method for implementing an all outdoor radio protection system uses a wireless channel operating at a license-free 60 GHz band that substantially obviates one or more problems due to limitations and disadvantages of the related art. A wireless connection operating at the license-free 60 GHz band may be used for all outdoor radios protection system to achieve a transmission speed of up to 10 Gbps in full duplex mode, and therefore, to accommodate bandwidth needs for current microwave radio applications, and for future capacity growth.

In an embodiment, a method is provided for implementing an all outdoor radios protection system using a wireless channel operating at a license-free 60 GHz band, the method including the steps of receiving a first downstream protection digital signal at a first protection interface of a first radio unit; converting the first downstream protection digital signal into a first downstream protection intermediate frequency (IF) signal at a first modulator/demodulator unit of the first radio unit; converting the first downstream protection IF signal into a first 60 GHz radio frequency (RF) signal, and amplifying the first 60 GHz RF signal at a first transceiver; transmitting the first 60 GHz RF signal at a first antenna of the first radio unit; receiving the first 60 GHz RF signal at a second antenna of a second radio unit; amplifying the first 60 GHz RF signal, and converting the first 60 GHz RF signal into a second upstream protection IF signal at a second transceiver of the second radio unit; converting the second upstream protection IF signal into a second upstream protection digital data at a second modulator/demodulator unit of the second radio unit; receiving the second upstream protection digital data at a second protection interface of the second radio unit.

In a further embodiment, provided is a method implementing an all outdoor radios protection system using a wireless channel operating at a license-free 60 GHz band, the method further including the steps of receiving a second downstream protection digital signal at the second protection interface; converting the second downstream protection digital signal into a second downstream protection intermediate frequency (IF) signal at the second modulator/demodulator unit; converting the second downstream protection IF signal into a second 60 GHz radio frequency (RF) signal, and amplifying the second 60 GHz RF signal at the second transceiver; transmitting the second 60 GHz RF signal at the second antenna; receiving the second 60 GHz RF signal at the first antenna; amplifying the second 60 GHz RF signal, and converting the second 60 GHz RF signal into a first upstream protection IF signal at the first transceiver; converting the first upstream protection IF signal into a first upstream protection digital data at the first modulator/demodulator unit; receiving the first upstream protection digital data at a first protection interface of the second radio unit.

In yet another embodiment, the first antenna and the second antenna are configured to operate at the license-free 60 GHz band.

In yet another embodiment, the first radio unit and the second radio unit are configured to operate at a space diversity manner.

In yet another embodiment, the first radio unit and the second radio unit are configured to operate at a frequency diversity manner.

In yet another embodiment, the first radio unit and the second radio unit are configured to operate at a hybrid diversity manner.

In yet a further embodiment, an all outdoor radios protection system is provided using a wireless channel operating at a license-free 60 GHz band including a first radio unit, where the first radio unit includes a first protection interface configured to receive a first downstream protection digital data; a first modulator/demodulator unit configured to convert the first downstream protection digital signal into a first downstream protection intermediate frequency (IF) signal; and a first transceiver configured to convert the first downstream protection IF signal into a first 60 GHz radio frequency (RF) signal, and amplify the first 60 GHz RF signal; a first antenna configured to transmit the first 60 GHz RF signal; a second radio unit, where the second radio unit includes a second antenna configured to receive the first 60 GHz RF signal; a second transceiver configured to amplify the first 60 GHz RF signal, and convert the first 60 GHz RF signal into a second upstream protection IF signal; a second modulator/demodulator unit configured to convert the second upstream protection IF signal into a second upstream protection digital data; a second protection interface configured to receive the second upstream protection digital data.

In yet another embodiment, an all outdoor radios protection system is provided using a wireless channel operating at a license-free 60 GHz band, wherein the second protection interface is further configured to receive a second downstream protection digital data; the second modulator/demodulator unit is further configured to convert the second downstream protection digital data into a second downstream protection IF signal; the second transceiver is further configured to convert the second downstream protection IF signal into a second 60 GHz RF signal, and amplify the second 60 GHz RF signal; the second antenna is further configured to transmit the second 60 GHz RF signal; the first antenna is further configured to receive the second 60 GHz RF signal; the first transceiver is further configured to amplify the second 60 GHz RF signal, and convert the second 60 GHz RF signal into a first upstream protection IF signal; the first modulator/demodulator unit is further configured to convert the first upstream protection IF signal into a first upstream protection digital data; the first protection interface is further configured to receive the first upstream protection digital data.

In accordance with some embodiments of the present invention, a system and method for implementing an XPIC application for an all outdoor radios system uses a wireless channel operating at a license-free 60 GHz band that substantially obviates one or more problems due to the limitations and disadvantages of the related art.

A wireless connection operating at the license-free 60 GHz band may be used to support both XPIC application and protection system for all outdoor radios to achieve a transmission speed of up to 10 Gbps in a full duplex mode, and therefore, to accommodate the bandwidth needs for current microwave radio applications, and for future capacity growth. In particular, the replacement of the conventional wired connection in both XPIC application and protection system with the license-free 60 GHz wireless connection eliminates multiple outdoor cables between radio units and multiple weatherproof connectors for cables on all outdoor radio units. For example, only one connector of a 60 GHz antenna is required for each outdoor radio unit. Further, the signal links for both XPIC application and protection system can be consolidated into a common 60 GHz wireless connection. Therefore, the installation of the all outdoor radio units is simplified and the associated maintenance cost is reduced.

In an embodiment, a method is provided for implementing an all outdoor radios XPIC application using a wireless channel operating at a license-free 60 GHz band, the method comprising the steps of: receiving a first downstream XPIC IF signal at a first receiver of a first radio unit; transmitting the first downstream XPIC IF signal to a first demodulator of the first radio unit and a first transceiver of the first radio unit, respectively; converting the first downstream XPIC IF signal into a first 60 GHz RF signal, and amplifying the first 60 GHz RF signal at the first transceiver of the first radio unit; transmitting the first 60 GHz RF signal at a first 60 GHz antenna of the first radio unit; receiving the first 60 GHz RF signal at a second 60 GHz antenna of a second radio unit; amplifying the first 60 GHz RF signal, and converting the first 60 GHz RF signal into a second upstream XPIC IF signal at a second transceiver of the second radio unit; and transmitting the second upstream XPIC IF signal to a second demodulator of the second radio unit.

In a further embodiment, a method is provided for implementing an all outdoor radios XPIC application using a wireless channel operating at a license-free 60 GHz band of claim 1, the method further comprising the steps of: receiving a second downstream XPIC IF signal at a second receiver of the second radio unit; transmitting the second downstream XPIC IF signal to the second demodulator of the second radio unit and the second transceiver of the second radio unit, respectively; converting the second downstream XPIC IF signal into a second 60 GHz RF signal, and amplifying the second 60 GHz RF signal at the second transceiver of the second radio unit; transmitting the second 60 GHz RF signal at the second 60 GHz antenna of the second radio unit; receiving the second 60 GHz RF signal at the first 60 GHz antenna of the first radio unit; amplifying the second 60 GHz RF signal, and converting the second 60 GHz RF signal into a first upstream XPIC IF signal at the first transceiver of the first radio unit; and transmitting the first upstream XPIC IF signal to the first demodulator of the first radio unit.

In yet another embodiment, the first radio unit is configured to use vertical polarization of an antenna coupling unit (ACU), and the second radio unit is configured to use horizontal polarization of the antenna coupling unit, both the first and second radio units being coupled to the antenna coupling unit.

In yet another embodiment, the first demodulator is configured to cancel interference of the horizontal polarization in the first downstream XPIC IF signal using the first upstream XPIC IF signal at the first demodulator of the first radio unit.

In yet another embodiment, the second demodulator is configured to cancel interference of the vertical polarization in the second downstream XPIC IF signal using the second upstream XPIC IF signal at the second demodulator of the second radio unit.

In yet another embodiment, the first downstream XPIC IF signal and the second downstream XPIC IF signal are configured to use different carrier frequencies within the license-free 60 GHz band.

In yet a further embodiment, an all outdoor radios system is configured with an XPIC application using a wireless channel operating at a license-free 60 GHz band, the system comprising: an antenna coupling unit; a first radio unit further comprising: a first receiver configured to receive a first downstream XPIC IF signal from a first duplexer; a first demodulator configured to receive the first downstream XPIC IF signal and a first upstream XPIC IF signal, respectively; a first transceiver configured to convert the first downstream XPIC IF signal into a first 60 GHz RF signal, and amplify the first 60 GHz RF signal; and a first 60 GHz antenna configured to transmit the first 60 GHz RF signal; a second radio unit further comprising: a second 60 GHz antenna configured to receive the first 60 GHz RF signal; a second transceiver configured to amplify the first 60 GHz RF signal, and convert the first 60 GHz RF signal into a second upstream XPIC IF signal; a second demodulator configured to receive the second upstream XPIC IF signal and a second downstream XPIC IF signal, respectively; and a second receiver configured to receive the second downstream XPIC IF signal from a second duplexer; wherein the first radio unit and the second radio unit are, respectively, coupled to the antenna coupling unit.

In yet another embodiment, the second transceiver is further configured to convert the second downstream XPIC IF signal into a second 60 GHz RF signal, and amplify the second 60 GHz RF signal; the second 60 GHz antenna is further configured to transmit the second 60 GHz RF signal; the first 60 GHz antenna is further configured to receive the second 60 GHz RF signal; and the first transceiver is further configured to amplify the second 60 GHz RF signal, and convert the second 60 GHz RF signal into the first upstream XPIC IF signal.

In yet another embodiment, the first demodulator of the first radio unit is further configured to cancel interference of the horizontal polarization in the first downstream XPIC IF signal using the first upstream XPIC IF signal.

In yet another embodiment, the second demodulator of the second radio unit is further configured to cancel interference of the vertical polarization in the second downstream XPIC IF signal using the second upstream XPIC IF signal.

In yet another embodiment, the first downstream XPIC IF signal and the second downstream XPIC IF signal are configured to use different carrier frequencies within the license-free 60 GHz band.

In yet another embodiment, a method is provided for implementing an all outdoor radios protection system and an all outdoor radios XPIC application using a wireless connection operating at a license-free 60 GHz band, the method comprising the steps of: receiving a first downstream XPIC IF signal at a first IF combiner of a first radio unit; receiving a first downstream protection IF signal at the first IF combiner of the first radio unit; combining the first downstream XPIC IF signal and the first downstream protection IF signal, and generating a first downstream combined IF signal at the first IF combiner of the first radio unit; converting the first downstream combined IF signal into a first 60 GHz RF signal, and amplifying the first 60 GHz RF signal at a first transceiver of the first radio unit; transmitting the first 60 GHz RF signal at a first 60 GHz antenna of the first radio unit; receiving the first 60 GHz RF signal at a second 60 GHz antenna of a second radio unit; amplifying the first 60 GHz RF signal, and converting the first 60 GHz RF signal into a second upstream combined IF signal at a second transceiver of the second radio unit; extracting a second upstream XPIC IF signal from the second upstream combined IF signal at a second IF splitter of the second radio unit; transmitting the second upstream XPIC IF signal to a second demodulator of the second radio unit; receiving the first 60 GHz RF signal at a third 60 GHz antenna of a third radio unit; amplifying the first 60 GHz RF signal, and converting the first 60 GHz RF signal into a third upstream combined IF signal at a third transceiver of the third radio unit; extracting a third upstream protection IF signal from the third upstream combined IF signal at a third IF splitter of the third radio unit, which further includes the steps of converting the third upstream protection IF signal into a third upstream protection digital packet at a third modem of the third radio unit; decapsulating the third upstream protection digital packet, and converting the third upstream protection digital packet into a third upstream protection digital signal; and transmitting the third upstream protection digital signal to a third protection interface of the third radio unit.

In a further embodiment, the first downstream protection IF signal is generated by: receiving a first downstream protection digital signal at a first protection interface of the first radio unit, encapsulating the first downstream protection digital signal into a first downstream protection digital packet at a first wireless controller of the first radio unit, and converting the first downstream protection digital packet into the first downstream protection IF signal at a first modem of the first radio unit In yet another embodiment, a method is provided for implementing an all outdoor radios protection system and an all outdoor radios XPIC application using a wireless connection operating at a license-free 60 GHz band, the method further comprising the steps of: receiving a second downstream XPIC IF signal at a second IF combiner of the second radio unit; receiving a second downstream protection IF signal at the second IF combiner of the second radio unit; combining the second downstream XPIC IF signal and the second downstream protection IF signal, and generating a second downstream combined IF signal at a second IF combiner of the second radio unit; converting the second downstream combined IF signal into a second 60 GHz RF signal, and amplifying the second 60 GHz RF signal at the second transceiver of the second radio unit; transmitting the second 60 GHz RF signal at the second antenna of the second radio unit; receiving the second 60 GHz RF signal at the first antenna of the first radio unit; amplifying the second 60 GHz RF signal, and converting the second 60 GHz RF signal into a first upstream combined IF signal at the first transceiver of the first radio unit; extracting a first upstream XPIC IF signal from the first upstream combined IF signal at a first IF splitter of the first radio unit; transmitting the first upstream XPIC IF signal to a first demodulator of the first radio unit; receiving the second 60 GHz RF signal at a fourth antenna of a fourth radio unit, amplifying the second 60 GHz RF signal, and converting the second 60 GHz RF signal into a fourth upstream combined IF signal at a fourth transceiver of the fourth radio unit; extracting a fourth upstream protection IF signal from the fourth upstream combined IF signal at a fourth IF splitter of the fourth radio unit, which further includes the steps of converting the fourth upstream protection IF signal into a fourth upstream protection digital packet at a fourth modem of the fourth radio unit; decapsulating the fourth upstream protection digital packet, and converting the fourth upstream protection digital packet into a fourth upstream protection digital signal; transmitting the fourth upstream protection digital signal to a fourth upstream protection interface of the fourth radio unit.

In a further embodiment, the second downstream protection IF signal is generated by: receiving a second downstream protection digital signal at a second protection interface of the second radio unit; encapsulating the second downstream protection digital signal into a second downstream protection digital packet at a second wireless controller of the second radio unit; and converting the second downstream protection digital packet into the second downstream protection IF signal at a second modem of the second radio unit.

In yet another embodiment, a method is provided for implementing an all outdoor radios protection system and an all outdoor radios XPIC application using a wireless connection operating at a license-free 60 GHz band, the method further comprising the steps of: receiving a third downstream XPIC IF signal at a third IF combiner of the third radio unit; receiving a third downstream protection IF signal at the third IF combiner of the third radio unit; combining the third downstream XPIC IF signal and the third downstream protection IF signal, and generating a third downstream combined IF signal at the third IF combiner of the third radio unit; converting the third downstream combined IF signal into a third 60 GHz RF signal, and amplifying the third 60 GHz RF signal at the third transceiver of the third radio unit; transmitting the third 60 GHz RF signal at the third antenna of the third radio unit; receiving the third 60 GHz RF signal at the fourth antenna of the fourth radio unit; amplifying the third 60 GHz RF signal, and converting the third 60 GHz RF signal into a fourth upstream combined IF signal at the fourth transceiver of the fourth radio unit; extracting a fourth upstream XPIC IF signal from the fourth upstream combined IF signal at the fourth IF splitter of the fourth radio unit; transmitting the fourth upstream XPIC IF signal to a fourth demodulator of the fourth radio unit; receiving the third 60 GHz RF signal at the first antenna of the first radio unit; amplifying the third 60 GHz RF signal, and converting the third 60 GHz RF signal into the first upstream combined IF signal at the first transceiver of the first radio unit; extracting a first upstream protection IF signal from the first upstream combined IF signal at the first IF splitter of the first radio unit, which further includes the steps of converting the first upstream protection IF signal into a first upstream protection digital packet at a first modem of the first radio unit; decapsulating the first upstream protection digital packet, and converting the first upstream protection digital packet into a first upstream protection digital signal; and transmitting the first upstream protection digital signal to a first protection interface of the first radio unit.

In a further embodiment, the third downstream protection IF signal is generated by: receiving a third downstream protection digital signal at a third protection interface of the third radio unit; encapsulating the third downstream protection digital signal into a third downstream protection digital packet at a third wireless controller of the third radio unit; and converting the third downstream protection digital packet into the third downstream protection IF signal at a third modem of the third radio unit.

In yet another embodiment, a method is provided for implementing an all outdoor radios protection system and an all outdoor radios XPIC application using a wireless connection operating at a license-free 60 GHz band, the method further comprising the steps of: receiving a fourth downstream XPIC IF signal at a fourth IF combiner of the fourth radio unit; receiving a fourth downstream protection IF signal at the fourth IF combiner of the fourth radio unit; combining the fourth downstream XPIC IF signal and the fourth downstream protection IF signal, and generating a fourth downstream combined IF signal at a fourth IF combiner of the fourth radio unit; converting the fourth downstream combined IF signal into a fourth 60 GHz RF signal, and amplifying the fourth 60 GHz RF signal at the fourth transceiver of the fourth radio unit; transmitting the fourth 60 GHz RF signal at the fourth antenna of the fourth radio unit; receiving the fourth 60 GHz RF signal at the third antenna of the third radio unit; amplifying the fourth 60 GHz RF signal, and converting the fourth 60 GHz RF signal into the third upstream combined IF signal at the third transceiver of the third radio unit; extracting a third upstream XPIC IF signal from the third upstream combined IF signal at the third IF splitter of the third radio unit; transmitting the third upstream XPIC IF signal to a third demodulator of the third radio unit; receiving the fourth 60 GHz RF signal at the second antenna of the second radio unit; amplifying the fourth 60 GHz RF signal, and converting the fourth 60 GHz RF signal into the second upstream combined IF signal at the second transceiver of the second radio unit; extracting the second upstream protection IF signal from the second upstream combined IF signal at the second IF splitter of the second radio unit, which further includes the steps of converting the second upstream protection IF signal into a second upstream protection digital packet at a second modem of the second radio unit; decapsulating the second upstream protection digital packet, and converting the second upstream protection digital packet into a second upstream protection digital signal; and transmitting the second upstream protection digital signal to a second protection interface of the second radio unit.

In a further embodiment, the fourth downstream protection IF signal is generated by: receiving a fourth downstream protection digital signal at a fourth protection interface of the fourth radio unit; encapsulating the fourth downstream protection digital signal into a fourth downstream protection digital packet at a fourth wireless controller of the fourth radio unit; and converting the fourth downstream protection digital packet into the fourth downstream protection IF signal at a fourth modem of the fourth radio unit.

In yet another embodiment, the first radio unit and the third radio unit are configured to use vertical polarization, and operate as a vertical polarization protection pair, and the second radio unit and the fourth radio unit are configured to use horizontal polarization, and operate as a horizontal polarization protection pair.

In yet another embodiment, the first radio unit and the second radio unit are configured to operate as a first XPIC pair, and the third radio unit and the fourth radio unit configured to operate as a second XPIC pair.

In yet another embodiment, the method of implementing an all outdoor radios protection system and an all outdoor radios XPIC application using a wireless connection operating at a license-free 60 GHz band further comprises the step of cancelling interference of the horizontal polarization in the first downstream XPIC IF signal using the first upstream XPIC IF signal at the first demodulator of the first radio unit.

In yet another embodiment, the method of implementing an all outdoor radios protection system and an all outdoor radios XPIC application using a wireless connection operating at a license-free 60 GHz band further comprises the step of cancelling interference of the vertical polarization in the second downstream XPIC IF signal using the second upstream XPIC IF signal at the second demodulator of the second radio unit.

In yet another embodiment, the first downstream XPIC IF signal and the second downstream XPIC IF signal are configured to use different carrier frequencies within the license-free 60 GHz band.

In yet another embodiment, the method of implementing an all outdoor radios protection system and an all outdoor radios XPIC application using a wireless connection operating at a license-free 60 GHz band further comprises the step of cancelling interference of the horizontal polarization in the third downstream XPIC IF signal using the third upstream XPIC IF signal at the third demodulator of the third radio unit.

In yet another embodiment, the method of implementing an all outdoor radios protection system and an all outdoor radios XPIC application using a wireless connection operating at a license-free 60 GHz band further comprises the step of cancelling interference of the vertical polarization in the fourth downstream XPIC IF signal using the fourth upstream XPIC IF signal at the fourth demodulator of the fourth radio unit.

In yet another embodiment, a protection interconnection within any one of the vertical polarization protection pair and the horizontal polarization protection pair and an XPIC interconnection within any one of the first XPIC pair and the second XPIC pair are configured to use different channels allocated within the license-free 60 GHz band.

In yet a further embodiment, an all outdoor radios system is configured with a protection system and an XPIC application using a wireless connection operating at a license-free 60 GHz band, the system further comprising a first XPIC pair including: a first antenna coupling unit; a first radio unit configured to use vertical polarization of the first antenna coupling unit and a second radio unit configured to use horizontal polarization of the first antenna coupling unit, wherein the first radio unit and the second radio unit are, respectively, coupled to the first antenna coupling unit; a second XPIC pair including: a second antenna coupling unit; a third radio unit configured to use vertical polarization of the second antenna coupling unit; and a fourth radio unit configured to use horizontal polarization of the second antenna coupling unit of the second antenna coupling unit, wherein the third radio unit and the fourth radio unit are connected to the second antenna coupling unit; wherein each of the first radio unit, the second radio unit, the third radio unit, and the fourth radio unit includes: a duplexer; a receiver configured to receive a downstream XPIC IF signal from the duplexer; a demodulator configured to receive the downstream XPIC IF signal and an upstream XPIC IF signal, and cancel interference of an opposite polarization in the downstream XPIC IF signal using the upstream XPIC IF signal; a protection interface configured to receive a downstream protection digital signal; a wireless controller configured to encapsulate the downstream protection digital signal into a downstream protection digital packet addressed to a destination radio unit; a modem configured to convert the downstream protection digital packet into a downstream protection IF signal; an IF combiner configured to combine the downstream XPIC IF signal and the downstream protection IF signal, and generate a downstream combined IF signal; an IF splitter configured to receive an upstream combined IF signal, and extract the upstream XPIC IF signal and the upstream protection IF signal from the upstream combined IF signal, respectively; a transceiver configured to convert the downstream combined IF signal into a downstream 60 GHz RF signal, and amplify the downstream 60 GHz RF signal; and a 60 GHz antenna configured to transmit the downstream 60 GHz RF signal.

In yet another embodiment, the 60 GHz antenna is further configured to receive an upstream 60 GHz RF signal; the transceiver is further configured to amplify the upstream 60 GHz RF signal, and convert the upstream 60 GHz RF signal into the upstream combined IF signal; the modem is further configured to convert the upstream protection IF signal into the upstream protection digital packet; the wireless controller is further configured to decapsulate the upstream protection digital packets, accept the upstream protection digital packet addressed to the destination radio unit that includes the wireless controller, and convert the accepted upstream protection digital packet into the upstream protection digital signal; and the protection interface is further configured to receive the upstream protection digital signal.

BRIEF DESCRIPTION OF THE DRAWINGS

The accompanying drawings, which are included to provide a further understanding of the invention and are incorporated herein and constitute a part of the specification, illustrate embodiments of the invention and together with the description serve to explain the principles of the invention. In the drawings:

FIG. 1A is an exemplary illustration of an all outdoor radios link aggregation system with a star-like wired connection in related art;

FIG. 1B is another exemplary illustration of an all outdoor radios link aggregation system with a daisy-chain wired connection in related art;

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of all outdoor radios link aggregation system using a wireless channel.

Figure 1C:
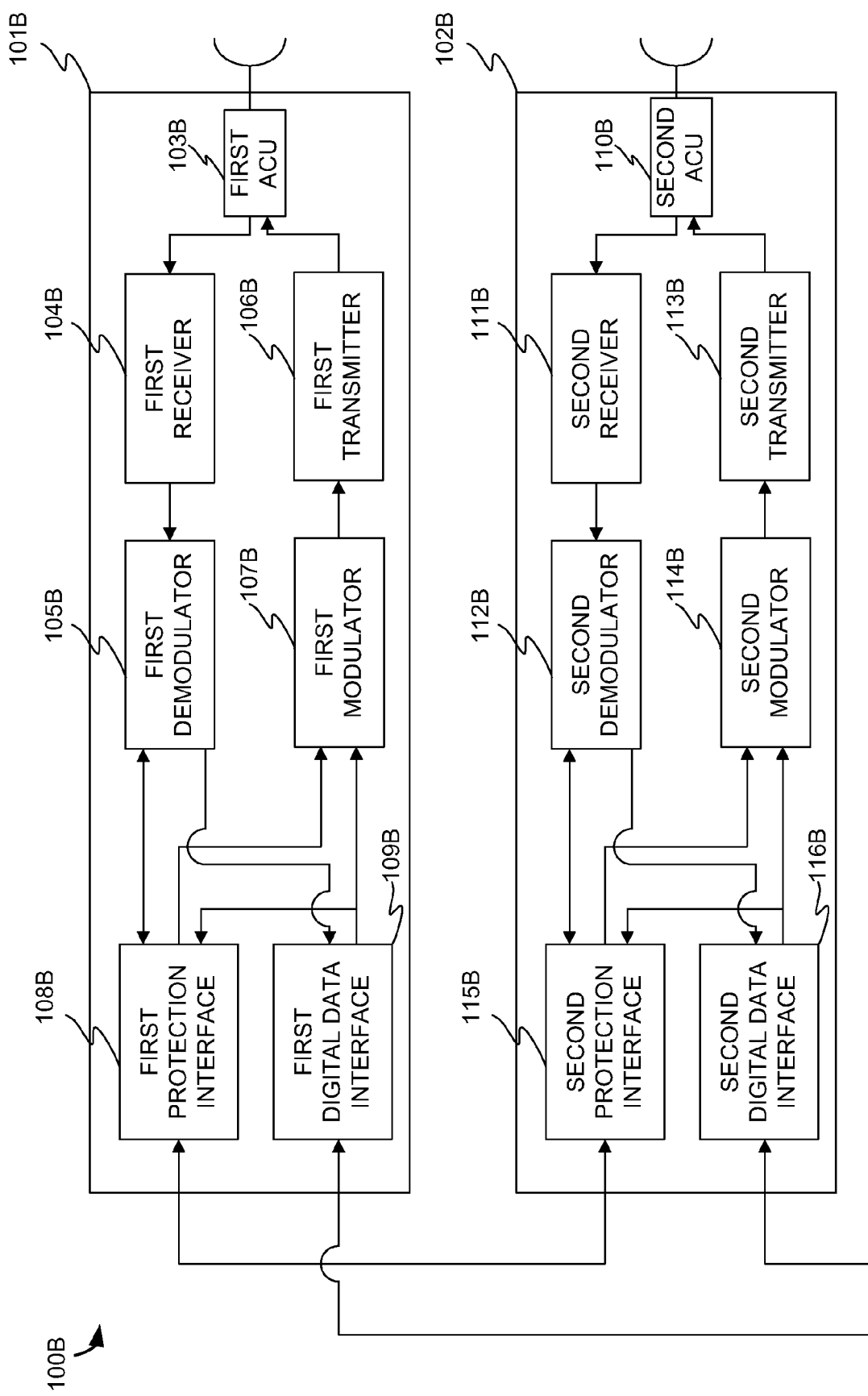
FIG. 1C illustrates an exemplary illustration of an all outdoor radios protection system using a wired connection in related art.
Figure 1D:
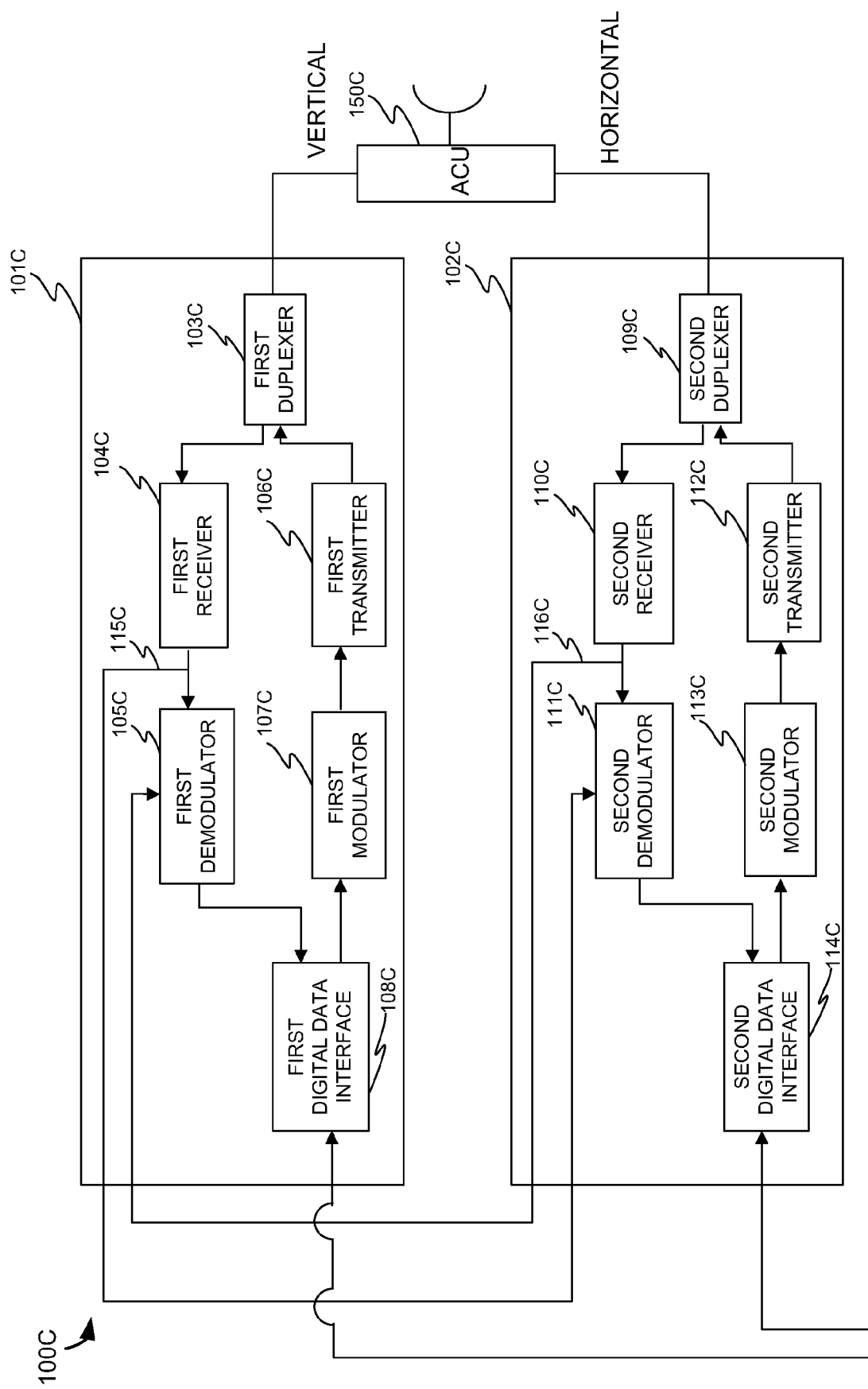
FIG. 1D is an exemplary illustration of an all outdoor radios system implemented with an XPIC application using a wired connection in related art.
Figure 1E:
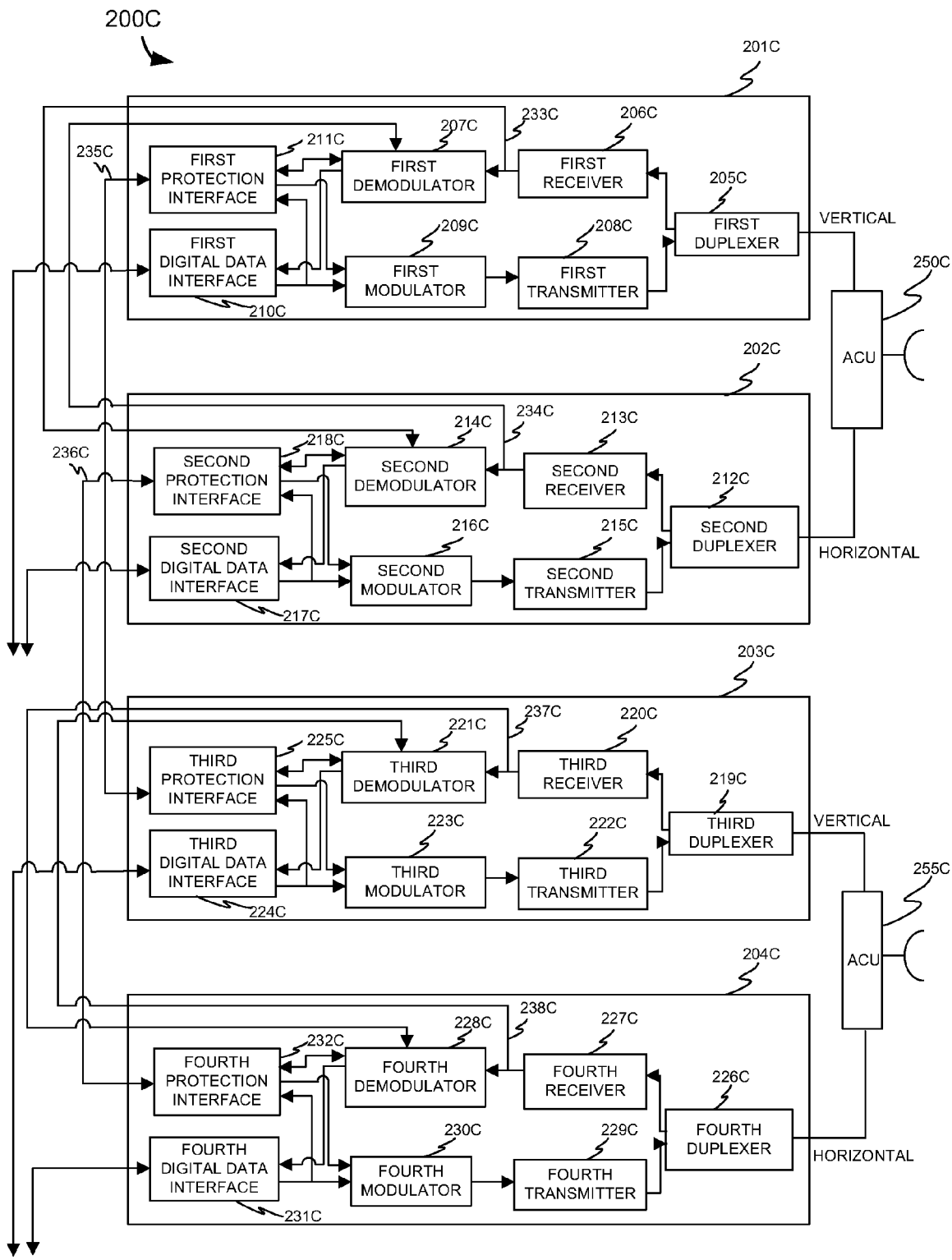
FIG. 1E is an exemplary illustration of an all outdoor radios system implemented with a protection system and an XPIC application using a wired connection in related art.
Figure 2:
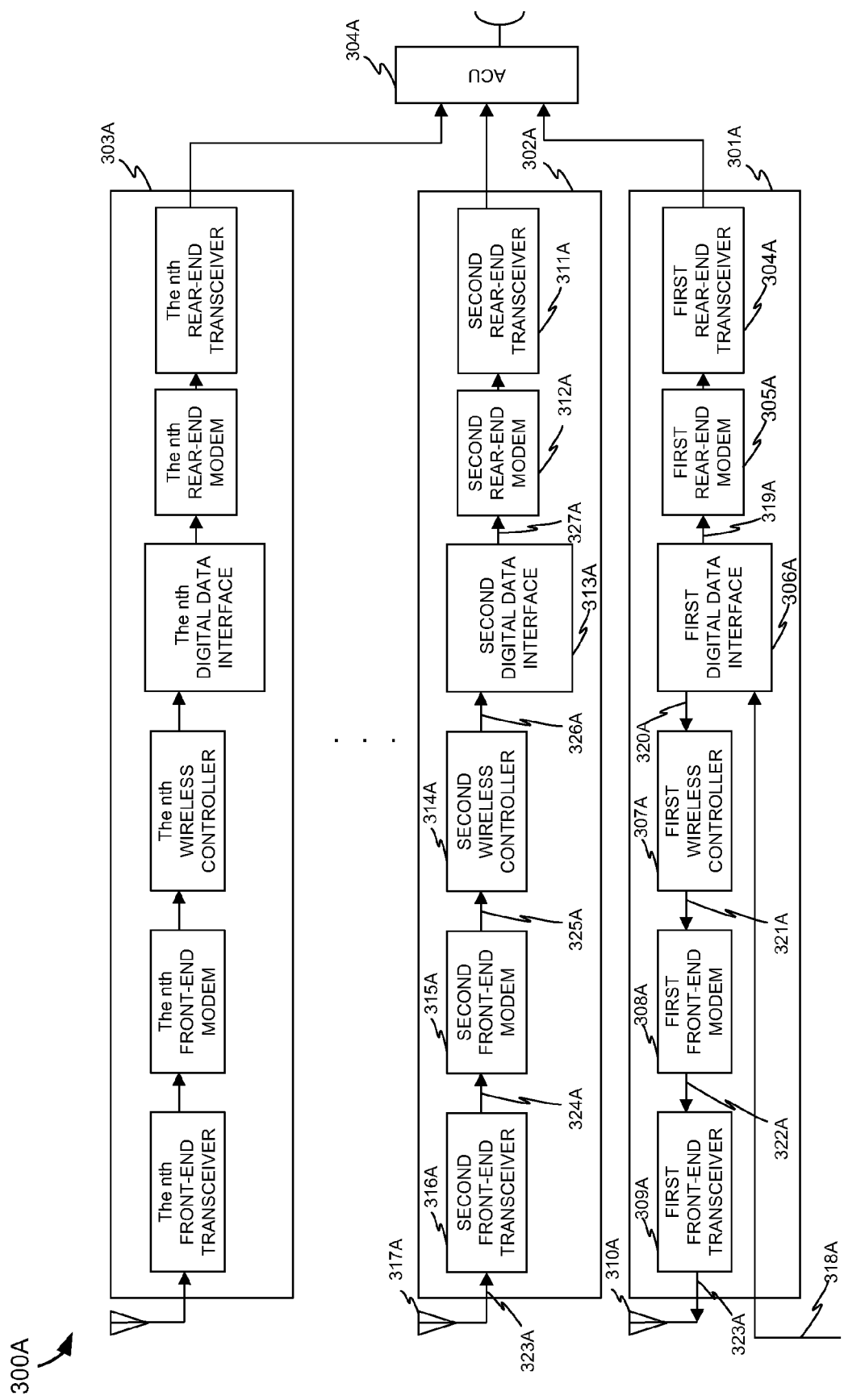
FIG. 2 illustrates an exemplary embodiment of an all outdoor radios link aggregation system using a wireless channel operating at a license-free 60 GHz band in accordance with the present invention.

FIG. 2 illustrates an exemplary embodiment of an all outdoor radios link aggregation system using a wireless channel operating at a license-free 60 GHz band in accordance with the present invention. In the exemplary embodiment 300A, the all outdoor radios link aggregation system may include a first radio unit 301A and at least a second radio unit 302A. The first radio unit 301A may include a first rear-end transceiver 304A, a first rear-end modem 305A, a first digital data interface 306A, a first wireless controller 307A, a first front-end modem 308A, a first front-end transceiver 309A, and a first 60 GHz antenna 310A. The second radio unit 302A may include a second rear-end transceiver 311A, a second rear-end modem 312A, a second digital data interface 313A, a second wireless controller 314A, a second front-end modem 315A, a second front-end transceiver 316A, a second 60 GHz antenna 317A. An upstream user data 318A may be received at the first digital data interface 306A. The first digital data interface 306A may split the upstream user data 318A into at least a first sub-stream digital data 319A and a second sub-stream digital data 320A. The first sub-stream digital data 319A may be transmitted through the first rear-end modem 305A and the first rear-end transceiver 304A. The second sub-stream digital data 320A may be transmitted to the first wireless controller 307A. The first wireless controller 307A may encapsulate the second sub-stream digital data 320A into a second sub-stream data packet 321A addressed to a first destination radio unit. The first front-end modem 308A may convert the second sub-stream data packet 321A into a first downstream data intermediate frequency (IF) signal 322A. The first front-end transceiver 309A may convert the first downstream data IF signal 322A into a first 60 GHz radio frequency (RF) signal 323A, and amplify the first 60 GHz RF signal 323A. The first 60 GHz antenna 310A may transmit the first 60 GHz RF signal 323A. The second 60 GHz antenna 317A may receive the first 60 GHz RF signal 323A.

The second front-end transceiver 316A in the second radio unit 302A may amplify the first 60 GHz RF signal 323A, and convert the first 60 GHz RF signal 323A into a second upstream data IF signal 324A. The second front-end modem 315A may convert the second upstream data IF signal 324A into a second upstream data packet 325A. The second wireless controller 314A may decapsulate the second upstream data packet 325A, accept the second upstream data packet 325A if the second radio unit 302A is the addressed first destination radio unit, and convert the second upstream data packet 325A into a second upstream digital data 326A. The second digital data interface 313A may receive the second upstream digital data 326A, and transmit the second upstream digital data 326A through the second rear-end modem 312A and the second rear-end transceiver 311A.

Figure 3:
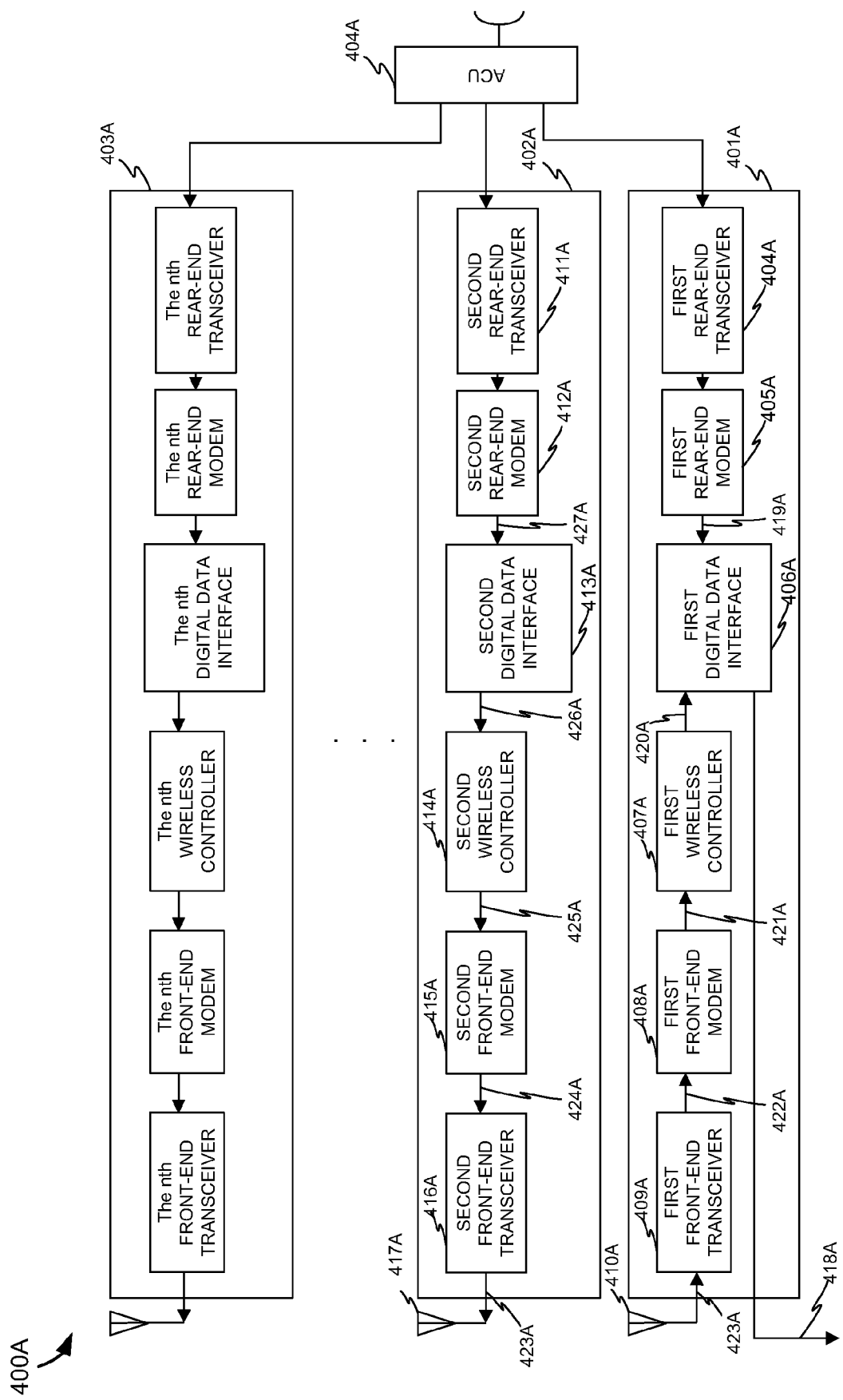
FIG. 3 illustrates another exemplary embodiment of an all outdoor radios link aggregation system using a wireless channel operating at a license-free 60 GHz band in accordance with the present invention.

FIG. 3 illustrates another exemplary embodiment of an all outdoor radios link aggregation system using a wireless channel operating at a license-free 60 GHz band in accordance with the present invention. In the exemplary embodiment 400A, the all outdoor radios link aggregation system may include a first radio unit 401A and at least a second radio unit 402A. The first radio unit 401A may include a first rear-end transceiver 404A, a first rear-end modem 405A, a first digital data interface 406A, a first wireless controller 407A, a first front-end modem 408A, a first front-end transceiver 409A, and a first 60 GHz antenna 410A. The second radio unit 402A may include a second rear-end transceiver 411A, a second rear-end modem 412A, a second digital data interface 413A, a second wireless controller 414A, a second front-end modem 415A, a second front-end transceiver 416A, and a second 60 GHz antenna 417A. The first digital data interface 406A may be further configured to receive a third sub-stream digital data 419A. The second digital data interface 413A in the second radio unit 402A may be further configured to receive a fourth sub-stream digital data 427A. The second wireless controller 414A may be further configured to encapsulate the fourth sub-stream digital data 426A from the second digital data interface 413A into a fourth sub-stream data packet 425A addressed to a second destination radio unit. The second front-end modem 415A may be further configured to convert the fourth sub-stream data packet 425A into a second downstream data IF signal 424A. The second front-end transceiver 416A may be further configured to convert the second downstream data IF signal 424A into a second 60 GHz radio RF signal 423A, and amplify the second 60 GHz RF signal 423A. The second 60 GHz antenna 417A may be further configured to transmit the second 60 GHz RF signal 423A. The first 60 GHz antenna 410A may be further configured to receive the second 60 GHz RF signal 423A. The first front-end transceiver 409A may be further configured to amplify the second 60 GHz RF signal 423A, and convert the second 60 GHz RF signal 423A into a first upstream data IF signal 422A. The first front-end modem 408A may be further configured to convert the first upstream data IF signal 422A into a first upstream data packet 421A. The first wireless controller 407A may be further configured to decapsulate the first upstream data packet 421A, accept the first upstream data packet 421A if the first radio unit 401A is the addressed second destination radio unit, and convert the first upstream data packet 421A into a first upstream digital data 420A. The first digital data interface 406A may be further configured to receive the first upstream digital data 420A, aggregate the first upstream digital data 420A and the third sub-stream digital data 419A, reconstruct a first downstream user data 418A, and transmit the first downstream user data 418A.

In some embodiment, the first sub-stream digital data is configured with a data rate equal to or less than the throughput of the first radio unit and the second sub-stream digital data is configured with a data rate equal to or less than the throughput of the second radio unit.

In some embodiment, the third sub-stream digital data is configured with a data rate equal to or less than the throughput of the first radio unit and the fourth sub-stream digital data is configured with a data rate equal to or less than the throughput of the second radio unit.

In some embodiment, the first radio unit and the second radio unit are configured to connect to an ACU 304A or 404A.

Figure 4:
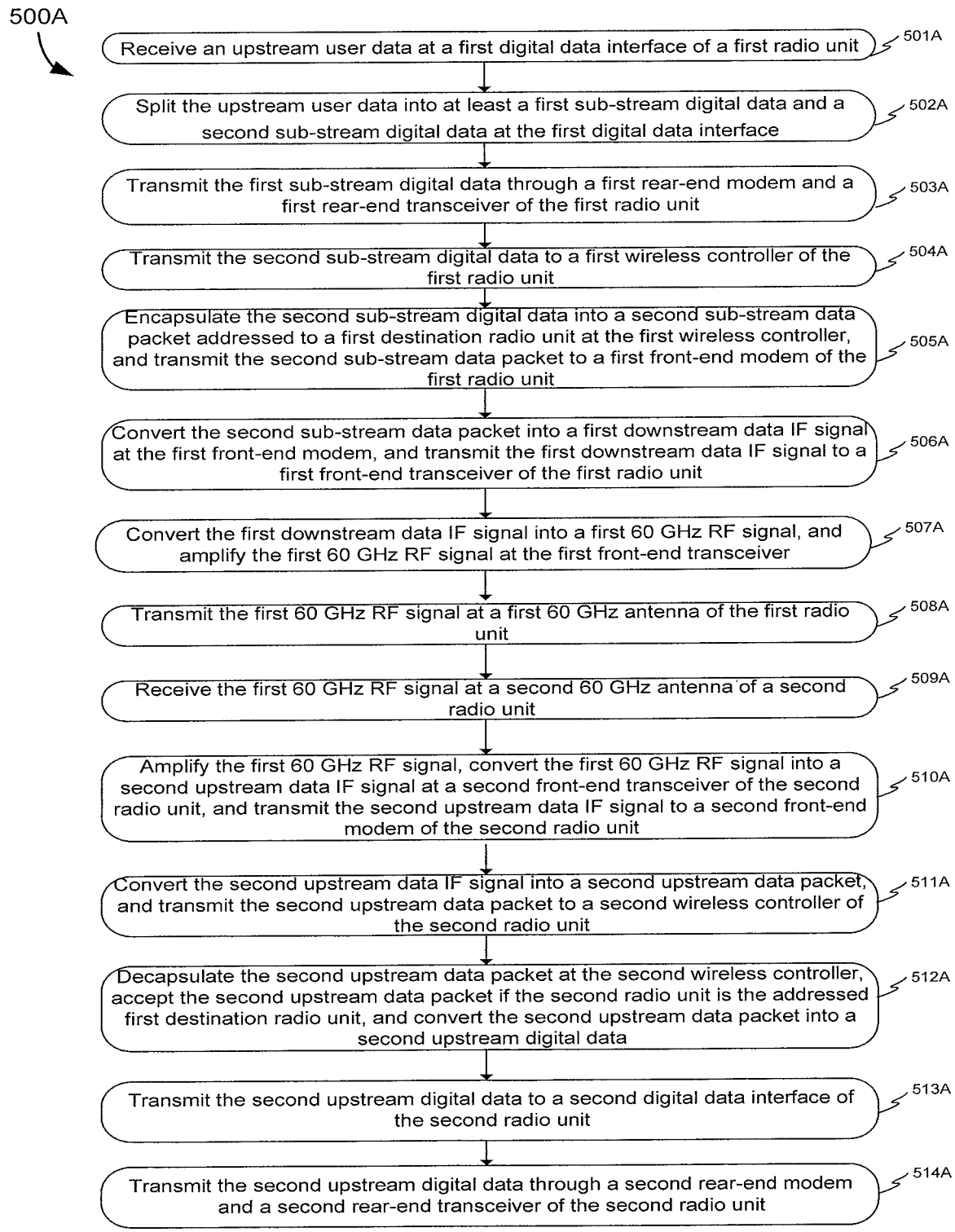
FIG. 4 illustrates an exemplary method performed by an all outdoor radios link aggregation system using a wireless channel operating at a license-free 60 GHz band in accordance with the present invention.

FIG. 4 illustrates an exemplary method of an all outdoor radios link aggregation system using a wireless channel operating at a license-free 60 GHz band in accordance with the present invention. The method includes: step 501A for receiving an upstream user data at a first digital data interface of a first radio unit; step 502A for splitting the upstream user data into at least a first sub-stream digital data and a second sub-stream digital data at the first digital data interface; step 503A for transmitting the first sub-stream digital data through a first rear-end modem and a first rear-end transceiver of the first radio unit; step 504A for transmitting the second sub-stream digital data to a first wireless controller of the first radio unit; step 505A for encapsulating the second sub-stream digital data into a second sub-stream data packet addressed to a first destination radio unit at the first wireless controller, and transmitting the second sub-stream data packet to a first front-end modem of the first radio unit; step 506A for converting the second sub-stream data packet into a first downstream data intermediate frequency (IF) signal at the first front-end modem, and transmitting the first downstream data IF signal to a first front-end transceiver of the first radio unit; step 507A for converting the first downstream data IF signal into a first 60 GHz radio frequency (RF) signal, and amplifying the first 60 GHz RF signal at the first front-end transceiver; step 508A for transmitting the first 60 GHz RF signal at a first 60 GHz antenna of the first radio unit; step 509A for receiving the first 60 GHz RF signal at a second 60 GHz antenna of a second radio unit; step 510A for amplifying the first 60 GHz RF signal, and converting the first 60 GHz RF signal into a second upstream data IF signal at a second front-end transceiver of the second radio unit, and transmitting the second upstream data IF signal to a second front-end modem of the second radio unit; step 511A for converting the second upstream data IF signal into a second upstream data packet, and transmitting the second upstream data packet to a second wireless controller of the second radio unit; step 512A for decapsulating the second upstream data packet at the second wireless controller, accepting the second upstream data packet if the second radio unit is the addressed first destination radio unit, and converting the second upstream data packet into a second upstream digital data; step 513A for transmitting the second upstream digital data to a second digital data interface of the second radio unit; and step 514A for transmitting the second upstream digital data through a second rear-end modem and a second rear-end transceiver of the second radio unit.

Figure 5:
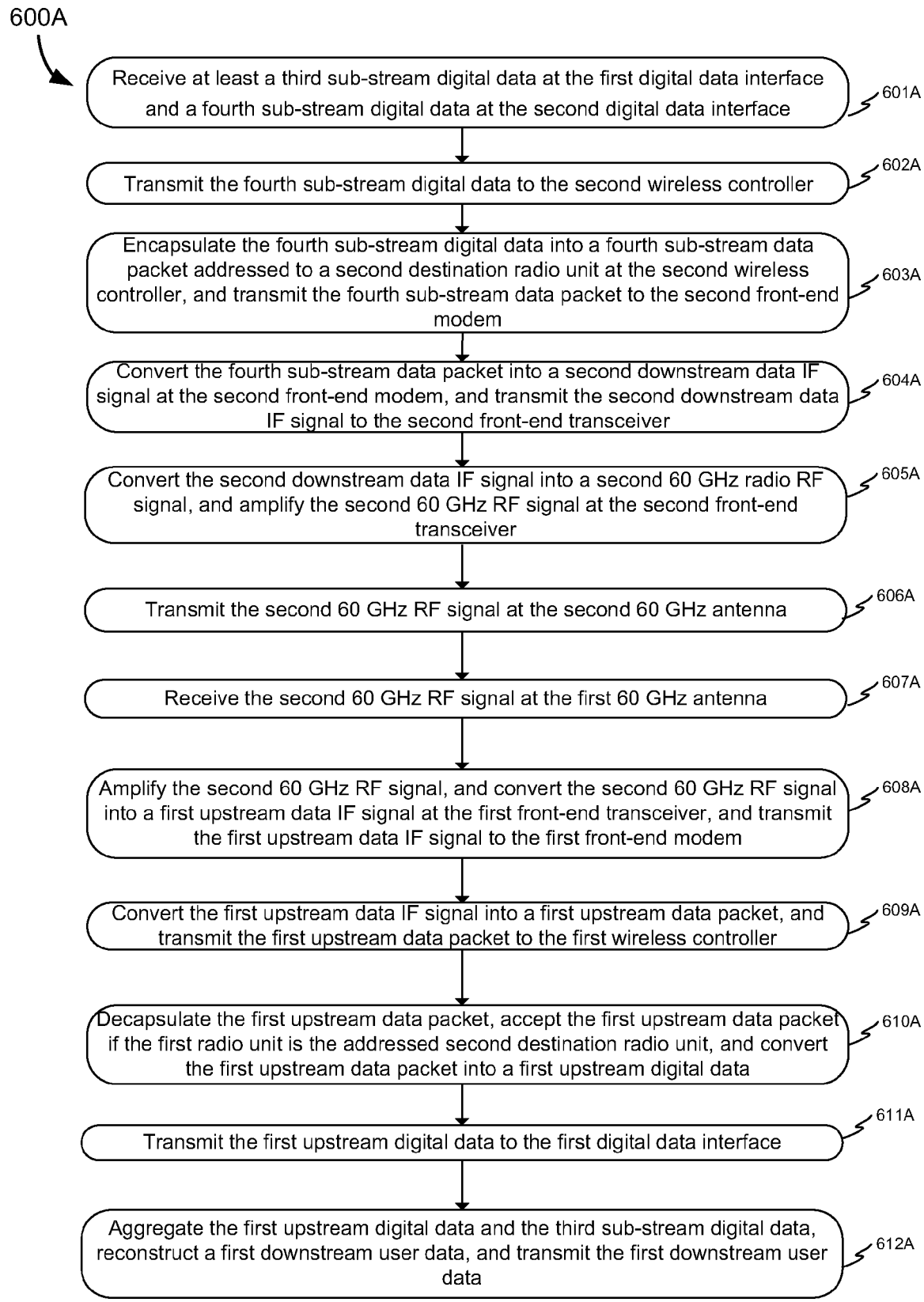
FIG. 5 illustrates another exemplary method performed by an all outdoor radios link aggregation system using a wireless channel operating at a license-free 60 GHz band in accordance with the present invention.

FIG. 5 illustrates another exemplary method of an all outdoor radios link aggregation system using a wireless channel operating at a license-free 60 GHz band in accordance with the present invention. The method includes: step 601A for receiving at least a third sub-stream digital data at the first digital data interface and a fourth sub-stream digital data at the second digital data interface; step 602A for transmitting the fourth sub-stream digital data to the second wireless controller; step 603A for encapsulating the fourth sub-stream digital data into a fourth sub-stream data packet addressed to a second destination radio unit at the second wireless controller, and transmitting the fourth sub-stream data packet to the second front-end modem; step 604A for converting the fourth sub-stream data packet into a second downstream data IF signal at the second front-end modem, and transmitting the second downstream data IF signal to the second front-end transceiver; step 605A for converting the second downstream data IF signal into a second 60 GHz radio RF signal, and amplifying the second 60 GHz RF signal at the second front-end transceiver; step 606A for transmitting the second 60 GHz RF signal at the second 60 GHz antenna; step 607A for receiving the second 60 GHz RF signal at the first 60 GHz antenna; step 608A for amplifying the second 60 GHz RF signal, and converting the second 60 GHz RF signal into a first upstream data IF signal at the first front-end transceiver, and transmitting the first upstream data IF signal to the first front-end modem; step 609A for converting the first upstream data IF signal into a first upstream data packet, and transmitting the first upstream data packet to the first wireless controller; step 610A for decapsulating the first upstream data packet, accepting the first upstream data packet if the first radio unit is the addressed second destination radio unit, and converting the first upstream data packet into a first upstream digital data; step 611A for transmitting the first upstream digital data to the first digital data interface; and step 612A for aggregating the first upstream digital data and the third sub-stream digital data, reconstructing a first downstream user data, and transmitting the first downstream user data.

Figure 6:
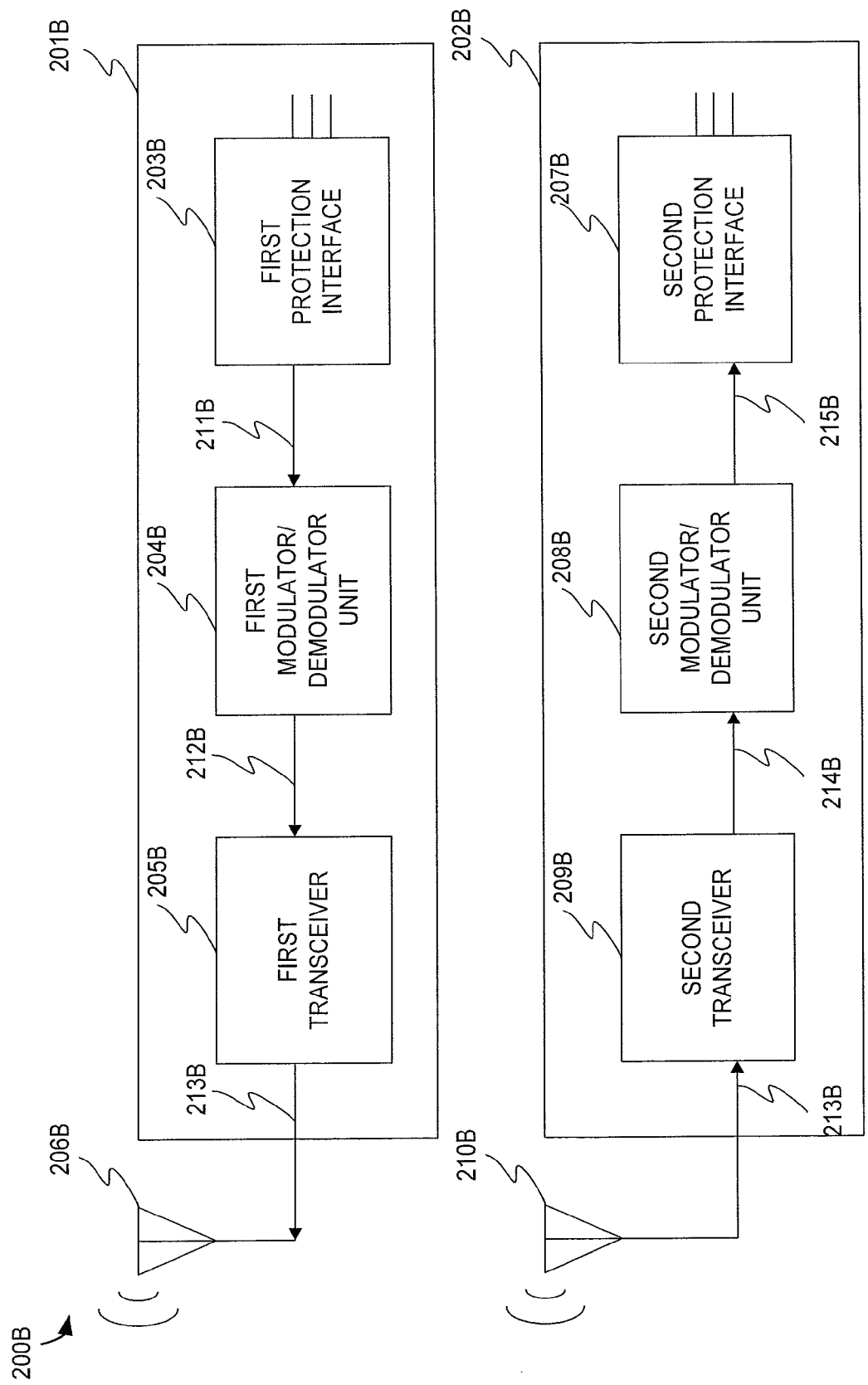
FIG. 6 illustrates an exemplary embodiment of an all outdoor radios protection system using a wireless channel operating at a license-free 60 GHz band in accordance with some embodiments of the present invention.

FIG. 6 illustrates an exemplary embodiment 200B of an all outdoor radios protection system using a wireless channel operating at a license-free 60 GHz band in accordance with some embodiments of the present invention. In the exemplary embodiment 200B, the all outdoor radios protection system may include a first radio unit 201B and a second radio unit 202B. The first radio unit 201B may include a first protection interface 203B, a first modulator/demodulator unit 204B, a first transceiver 205B, and a first antenna 206B. The second radio unit 202B may include a second protection interface 207B, a second modulator/demodulator unit 208B, a second transceiver 209B, and a second antenna 210B. A first downstream protection digital data 211B may be received at the first protection interface 203B, and transmitted to the first modulator/demodulator unit 204B. The first modulator/demodulator unit 204B may convert the first downstream protection digital data 211B into a first downstream protection intermediate frequency (IF) signal 212B, and transmit the first downstream protection IF signal 212B to the first transceiver 205B. The first transceiver 205B may convert the first downstream protection IF signal 212B into a first 60 GHz radio frequency (RF) signal 213B, and amplifies the first 60 GHz RF signal 213B. The amplified first 60 GHz RF signal 213B may be transmitted to a first antenna 206B connected to the first transceiver 205B.

In some embodiment, the first antenna 206B may transmit the first 60 GHz RF signal 213B to the second antenna 210B. The second antenna 210B may transmit the received first 60 GHz RF signal 213B to the second transceiver 209B. The second transceiver 209B may amplify the received first 60 GHz RF signal 213B, and convert the received first 60 GHz RF signal 213B into a second upstream protection IF signal 214B. The second upstream protection IF signal 214B may be transmitted to the second modulator/demodulator unit 208B. The second modulator/demodulator unit 208B may convert the second upstream protection IF signal 214B into a second upstream protection digital data 215B. The second upstream protection digital data 215B may be received at the second protection interface 207B.

In some embodiment, the first antenna 206B and the second antenna 210B are configured to operate at the license-free 60 GHz band.

In some embodiment, the first radio unit 201B and the second radio unit 202B are configured to operate at a space diversity manner.

In another embodiment, the first radio unit 201B and the second radio unit 202B are configured to operate at a frequency diversity manner.

In yet another embodiment, the first radio unit 201B and the second radio unit 202B are configured to operate at a hybrid diversity manner.

Figure 7:
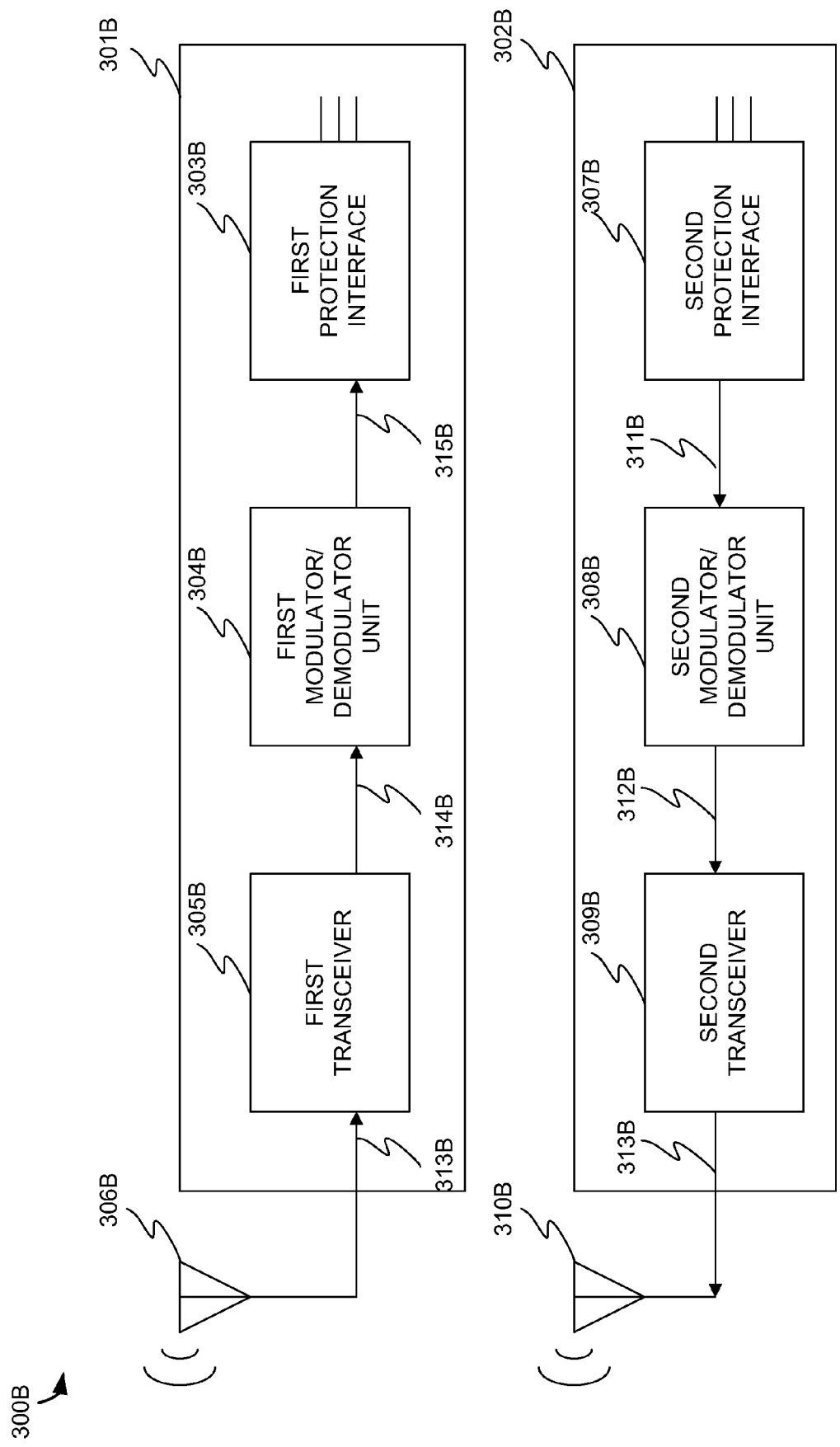
FIG. 7 illustrates another exemplary embodiment of an all outdoor radios protection system using a wireless channel operating at a license-free 60 GHz band in accordance with some embodiments of the present invention.

FIG. 7 illustrates another exemplary embodiment 300B of an all outdoor radios protection system using a wireless channel operating at a license-free 60 GHz band in accordance with some embodiments of the present invention. In the exemplary embodiment 300B, the all outdoor radios protection system may include a first radio unit 301B and a second radio unit 302B. The first radio unit 301B may include a first protection interface 303B, a first modulator/demodulator unit 304B, a first transceiver 305B, and a first antenna 306B. The second radio unit 302B may include a second protection interface 307B, a second modulator/demodulator unit 308B, a second transceiver 309B, and a second antenna 310B. A second downstream protection digital data 311B may be received at the second protection interface 307B, and transmitted to the second modulator/demodulator unit 308B. The second modulator/demodulator unit 308B may convert the second downstream protection digital data 311B into a second downstream protection intermediate frequency (IF) signal 312B, and transmit the second downstream protection IF signal 312B to the second transceiver 309B. The second transceiver 309B may convert the second downstream protection IF signal 312B into a second 60 GHz radio frequency (RF) signal 313B, and amplifies the second 60 GHz RF signal 313B. The amplified second 60 GHz RF signal 313B may be transmitted to a second antenna 310B connected to the second transceiver 309B.

In some embodiment, the second antenna 310B may transmit the second 60 GHz RF signal 313B to the first antenna 306B. The first antenna 306B may transmit the received second 60 GHz RF signal 313B to the first transceiver 305B. The first transceiver 305B may amplify the received second 60 GHz RF signal 313B, and convert the received second 60 GHz RF signal 313B into a first upstream protection IF signal 315B. The first upstream protection IF signal 314B may be transmitted to the first modulator/demodulator unit 304B. The first modulator/demodulator unit 304B may convert the first upstream protection IF signal 314B into a first upstream protection digital data 315B. The first upstream protection digital data 315B may be received at the first protection interface 303B.

In some embodiment, the first antenna 306B and the second antenna 310B are configured to operate at the license-free 60 GHz band.

In some embodiment, the first radio unit 301B and the second radio unit 302B are configured to operate at a space diversity manner.

In another embodiment, the first radio unit 301B and the second radio unit 302B are configured to operate at a frequency diversity manner.

In yet another embodiment, the first radio unit 301B and the second radio unit 302B are configured to operate at a hybrid diversity manner.

Figure 8:
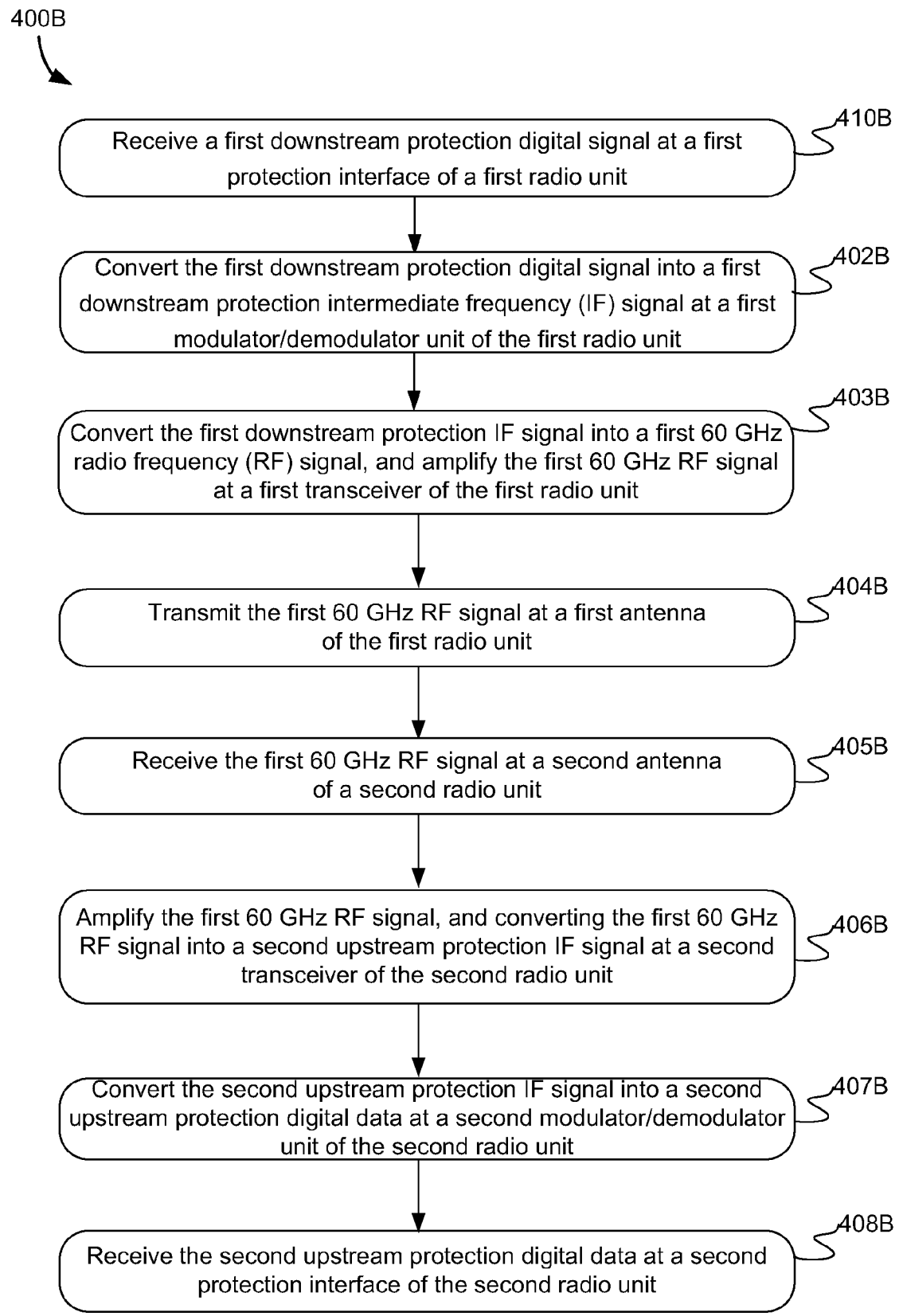
FIG. 8 illustrates an exemplary method of an all outdoor radios protection system using a wireless channel operating at a license-free 60 GHz band in accordance with some embodiments of the present invention.

FIG. 8 illustrates an exemplary method of an all outdoor radios protection system using a wireless channel operating at a license-free 60 GHz band in accordance with some embodiments of the present invention. The method includes: step 401B for receiving a first downstream protection digital signal 211B at a first protection interface 203B of a first radio unit 201B, step 402B for converting the first downstream protection digital signal 211B into a first downstream protection intermediate frequency (IF) signal 212B at a first modulator/demodulator unit 204B of the first radio unit 201B, step 403B for converting the first downstream protection IF signal 212B into a first 60 GHz radio frequency (RF) signal 213B, and amplifying the first 60 GHz RF signal 213B at a first transceiver 205B of the first radio unit 201B, step 404B for transmitting the first 60 GHz RF signal 213B at a first antenna 206B of the first radio unit 201B, step 405 for receiving the first 60 GHz RF signal 213B at a second antenna 210B of a second radio unit 202B, step 406B for amplifying the first 60 GHz RF signal 213B, and converting the first 60 GHz RF signal 213B into a second upstream protection IF signal 214B at a second transceiver 209B of the second radio unit 202B, step 407B for converting the second upstream protection IF signal 214B into a second upstream protection digital data 215B at a second modulator/demodulator unit 208B of the second radio unit 202B, step 408B for receiving the second upstream protection digital data 215B at a second protection interface 207B of the second radio unit 202B.

Figure 9:
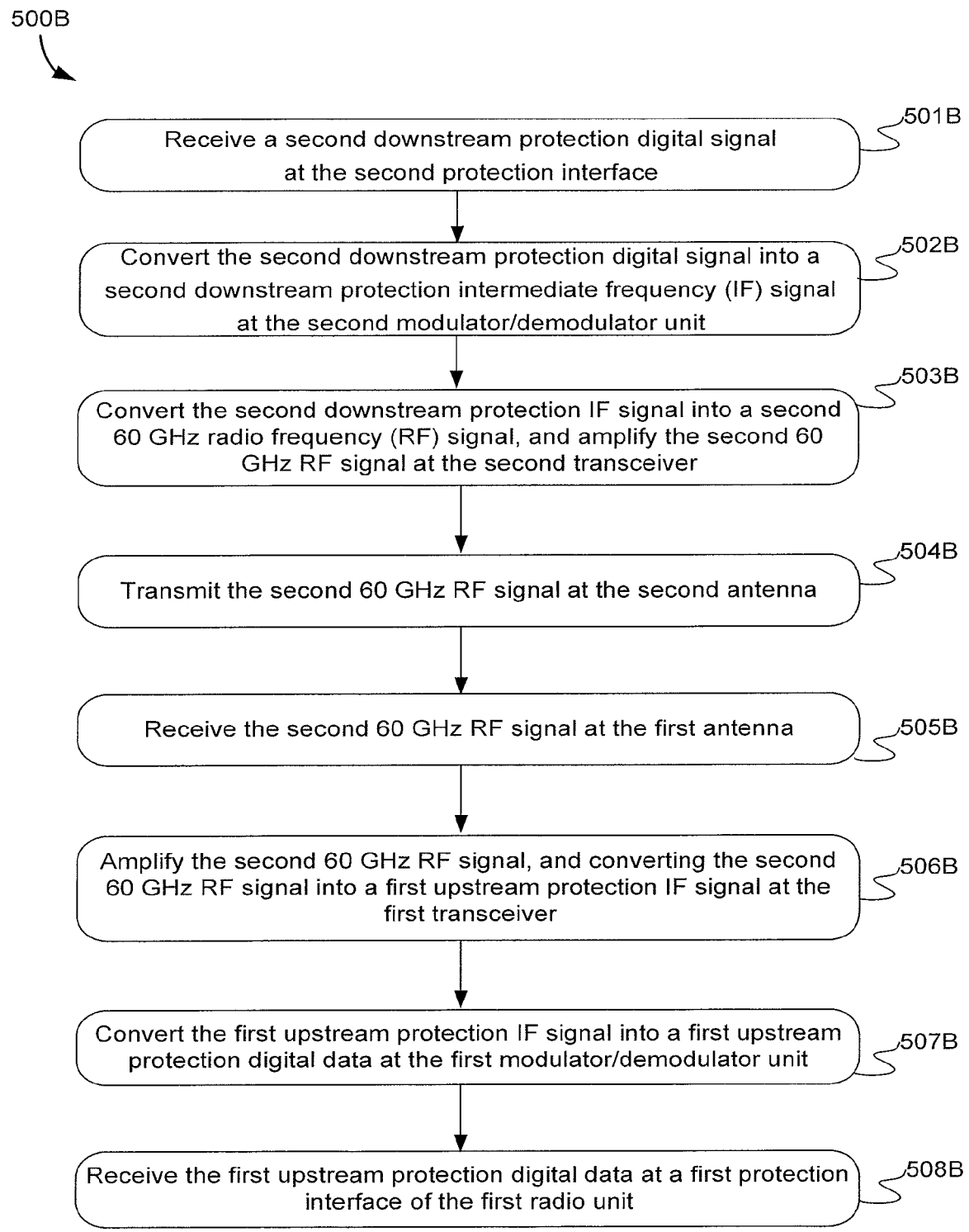
FIG. 9 illustrates another exemplary method of an all outdoor radios protection system using a wireless channel operating at a license-free 60 GHz band in accordance with some embodiments of the present invention.

FIG. 9 illustrates another exemplary method of an all outdoor radios protection system using a wireless channel operating at a license-free 60 GHz band in accordance with some embodiments of the present invention. The method includes: step 501B for receiving a second downstream protection digital signal 311B at the second protection interface 307B, step 502B for converting the second downstream protection digital signal 311B into a second downstream protection intermediate frequency (IF) signal 312B at the second modulator/demodulator unit 308B, step 503B for converting the second downstream protection IF signal 312B into a second 60 GHz radio frequency (RF) signal 313B, and amplifying the second 60 GHz RF signal 313B at the second transceiver 309B, step 504B for transmitting the second 60 GHz RF signal 313B at the second antenna 310B, step 505B for receiving the second 60 GHz RF signal 313B at the first antenna 306B, step 506B for amplifying the second 60 GHz RF signal 313B, and converting the second 60 GHz RF signal 313B into a first upstream protection IF signal 314B at the first transceiver 305B, step 507B for converting the first upstream protection IF signal 314B into a first upstream protection digital data 315B at the first modulator/demodulator unit 304B, step 408B for receiving the first upstream protection digital data 315B at a first protection interface 303B of the first radio unit 301B.

Figure 10:
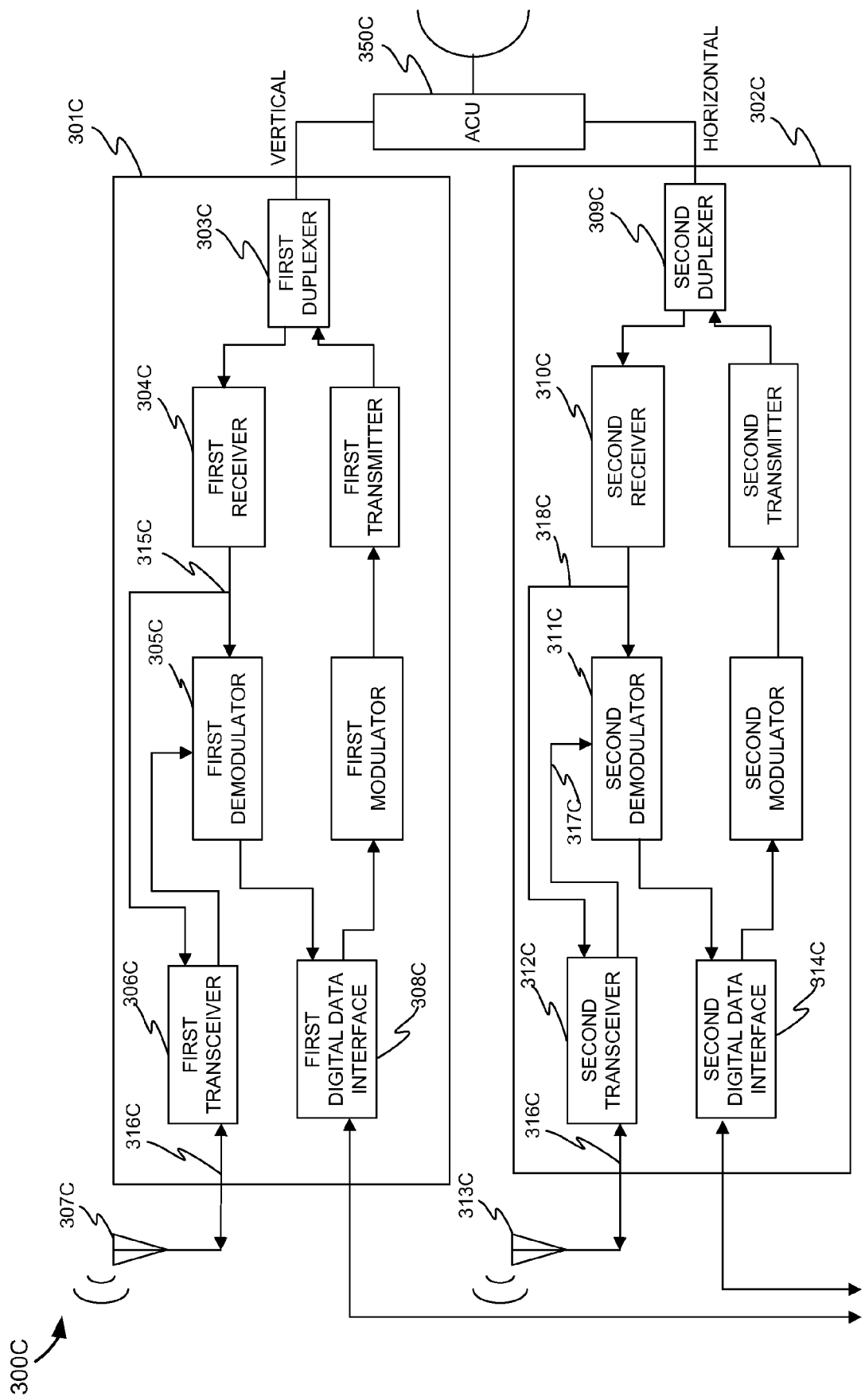
FIG. 10 illustrates an exemplary embodiment of an all outdoor radios system configured with an XPIC application using a wireless channel operating at a license-free 60 GHz band in accordance with the present invention.

FIG. 10 illustrates an exemplary embodiment of an all outdoor radios system configured with an XPIC application using a wireless channel operating at a license-free 60 GHz band in accordance with the present invention. In the exemplary embodiment 300C, the all outdoor radios system configured with an XPIC application using a wireless channel operating at a license-free 60 GHz band may include a first radio unit 301C and a second radio unit 302C, both of which are coupled to an ACU 350C. The first radio unit 301C may include a first duplexer 303C, a first receiver 304C, a first demodulator 305C, a first transceiver 306C, a first 60 GHz antenna 307C, and a first digital data interface 308C. The second radio unit 302C may include a second duplexer 309C, a second receiver 310C, a second demodulator 311C, a second transceiver 312C, a second 60 GHz antenna 313C, and a second digital data interface 314C. A first downstream XPIC IF signal 315C may be received at the first receiver 304C, and transmitted to the first demodulator 305C and the first transceiver 306C, respectively. The first transceiver 306C may convert the first downstream XPIC IF signal 315C into a first 60 GHz RF signal 316C, and amplify the first 60 GHz RF signal 316C. The amplified first 60 GHz RF signal 316C may be transmitted to a first 60 GHz antenna 307C connected to the first transceiver 306C.

In some embodiment, the first 60 GHz antenna 307C may transmit the first 60 GHz RF signal 316C to the second 60 GHz antenna 313C. The second 60 GHz antenna 313C may transmit the received first 60 GHz RF signal 316C to the second transceiver 312C. The second transceiver 312C may amplify the received first 60 GHz RF signal 316C, and convert the received first 60 GHz RF signal 316C into a second upstream XPIC IF signal 317C. The second upstream XPIC IF signal 317C may be transmitted to the second demodulator 311C.

In some embodiment, the first radio unit 301C may use vertical polarization, and the second radio unit 302C may use horizontal polarization.

In some embodiment, the second demodulator 311C may use the second upstream XPIC IF signal 317C to cancel interference of the vertical polarization in the second downstream XPIC IF signal 318C received at the second receiver 310C.

Figure 11:
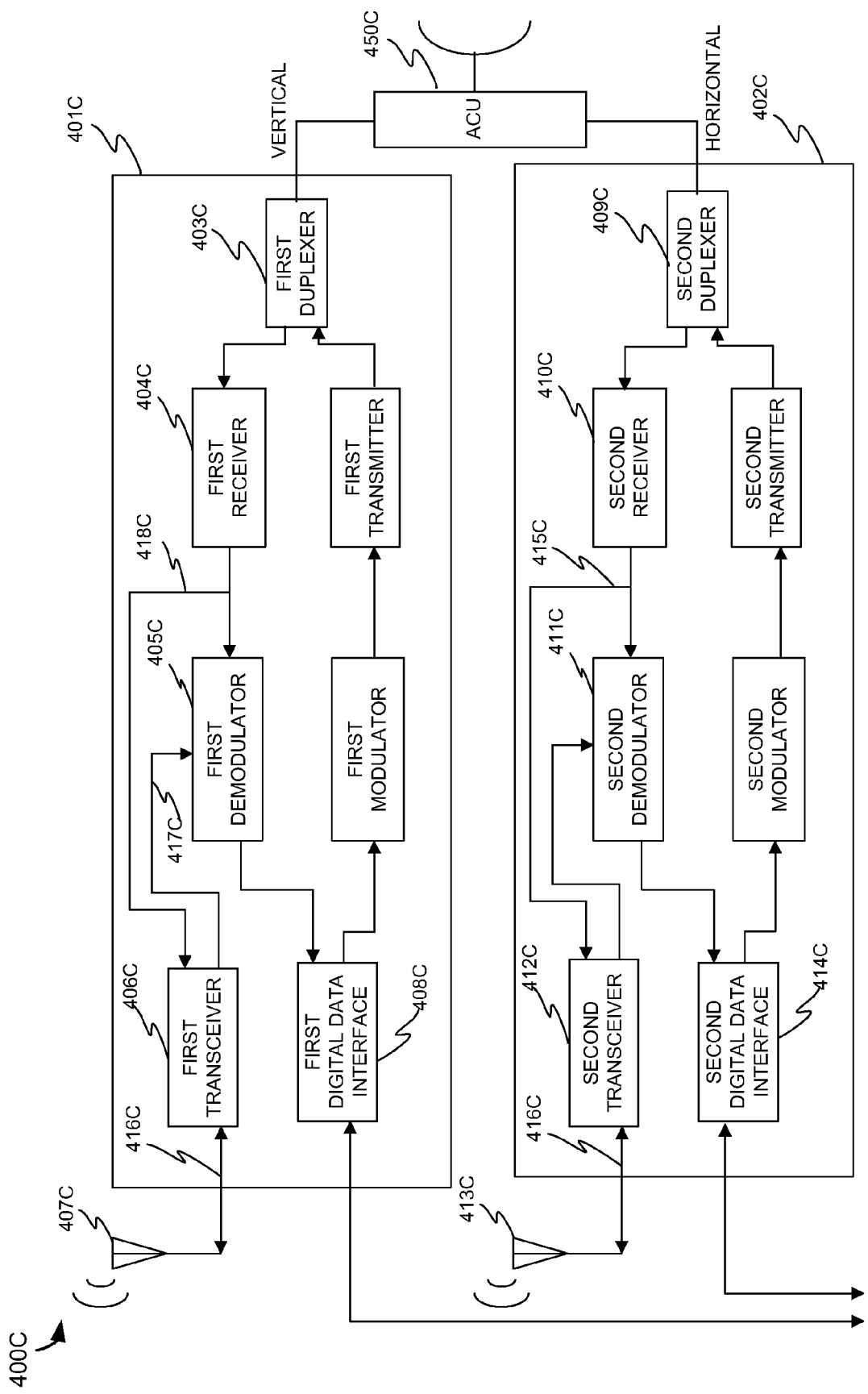
FIG. 11 illustrates another exemplary embodiment of an all outdoor radios system configured with an XPIC application using a wireless channel operating at a license-free 60 GHz band in accordance with the present invention.

FIG. 11 illustrates another exemplary embodiment of an all outdoor radios system configured with an XPIC application using a wireless channel operating at a license-free 60 GHz band in accordance with the present invention. In the exemplary embodiment 400C, the all outdoor radios system configured with an XPIC application using a wireless channel operating at a license-free 60 GHz band may include a first radio unit 401C and a second radio unit 402C, both of which are coupled to an ACU 450C. The first radio unit 401C may include a first duplexer 403C, a first receiver 404C, a first demodulator 405C, a first transceiver 406C, a first 60 GHz antenna 407C, and a first digital data interface 408C. The second radio unit 402C may include a second duplexer 409C, a second receiver 410C, a second demodulator 411C, a second transceiver 412C, a second 60 GHz antenna 413C, and a second digital data interface 414C. A second downstream XPIC IF signal 415C may be received at the second receiver 410C, and transmitted to the second demodulator 411C and the second transceiver 412C, respectively. The second transceiver 412C may convert the second downstream XPIC IF signal 415C into a second 60 GHz RF signal 416C, and amplify the second 60 GHz RF signal 416C. The amplified second 60 GHz RF signal 416C may be transmitted to a second 60 GHz antenna 413C connected to the second transceiver 412C.

In some embodiment, the second 60 GHz antenna 413C may transmit the second 60 GHz RF signal 416C to the first 60 GHz antenna 407C. The first 60 GHz antenna 407C may transmit the received second 60 GHz RF signal 416C to the first transceiver 406C. The first transceiver 406C may amplify the received second 60 GHz RF signal 416C, and convert the received second 60 GHz RF signal 416C into a first upstream XPIC IF signal 417C. The first upstream XPIC IF signal 417C may be transmitted to the first demodulator 405C.

In some embodiment, the first radio unit 401C may use vertical polarization, and the second radio unit 402C may use horizontal polarization.

In some embodiment, the first demodulator 405C may use the first upstream XPIC IF signal 417C to cancel interference of the horizontal polarization in the first downstream XPIC IF signal 418C received at the first receiver 404C.

Figure 12:
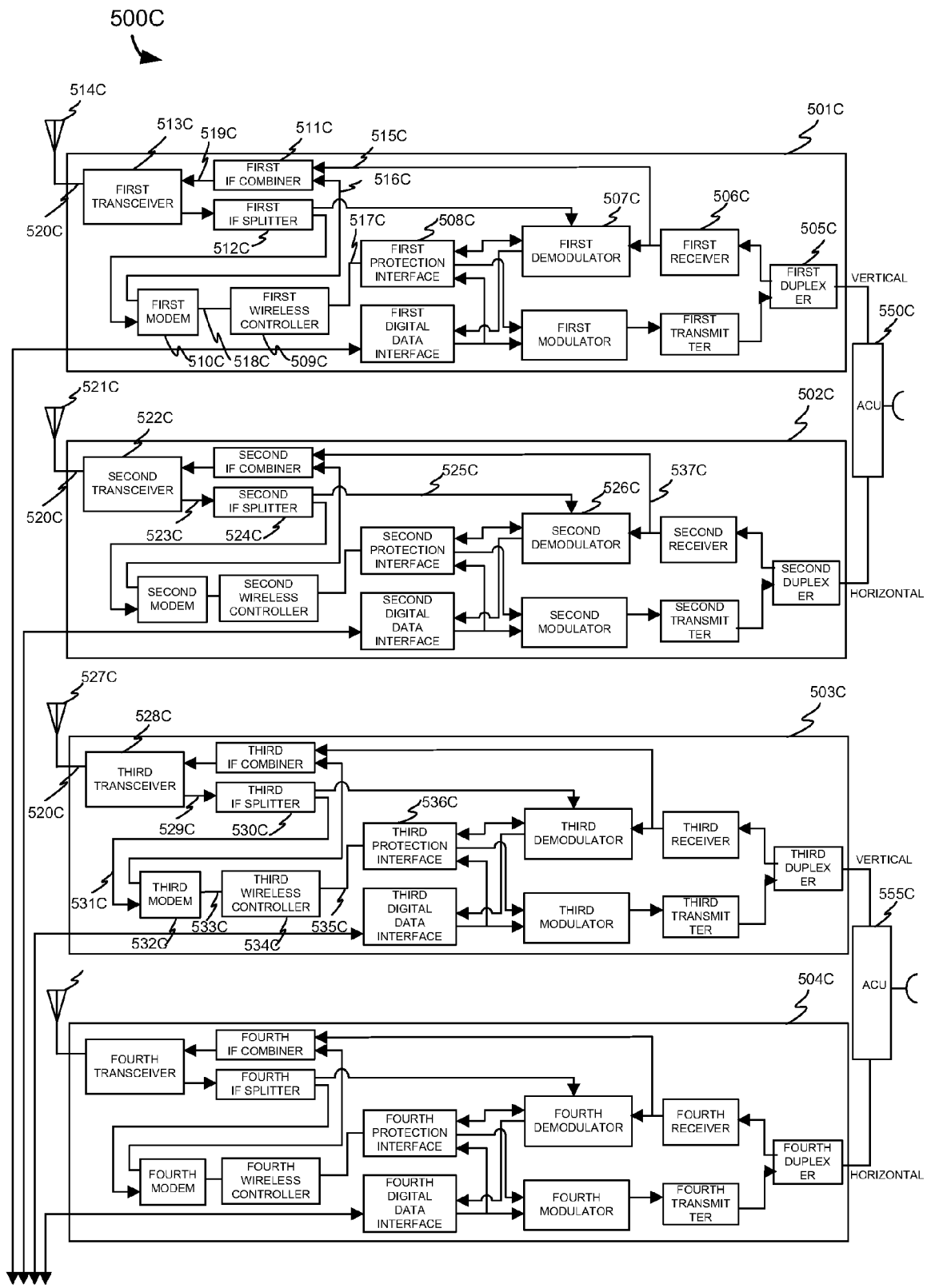
FIG. 12 illustrates an exemplary embodiment of an all outdoor radios system configured with a protection system and an XPIC application using a wireless channel operating at a license-free 60 GHz band in accordance with the present invention.

FIG. 12 illustrates an exemplary embodiment of an all outdoor radios system configured with a protection system and an XPIC application using a wireless channel operating at a license-free 60 GHz band in accordance with the present invention. In the exemplary embodiment 500C, the all outdoor radios system configured with a protection system and an XPIC application using a wireless channel operating at a license-free 60 GHz band may include: a first radio unit 501C configured to use vertical polarization, a second radio unit 502C configured to use horizontal polarization, a third radio unit 503C configured to use vertical polarization, and a fourth radio unit 504C configured to use horizontal polarization. The first radio unit 501C and the second radio unit 502C are communicatively coupled to an ACU 550C and the third radio unit 503C and the fourth radio unit 504C are communicatively coupled to an ACU 555C, respectively. The first radio unit 501C may include a first duplexer 505C, a first receiver 506C, a first demodulator 507C, a first protection interface 508C, a first wireless controller 509C, a first modem 510C, a first IF combiner 511C, a first IF splitter 512C, a first transceiver 513C, and a first 60 GHz antenna 514C. A first downstream XPIC IF signal 515C and a first downstream protection IF signal 516C may be received at the first IF combiner 511C. The first IF combiner 511C may combine the first downstream XPIC IF signal 515C and the first downstream protection IF signal 516C, and generate a first downstream combined IF signal 519C. The first downstream combined IF signal 519C may be transmitted to the first transceiver 513C.

The first transceiver 513C may convert the first downstream combined IF signal 519C into a first 60 GHz RF signal 520C, and amplify the first 60 GHz RF signal 520C. The amplified first 60 GHz RF signal 520C may be transmitted to a first 60 GHz antenna 514C connected to the first transceiver 513C.

In some embodiment, a first downstream protection digital signal 517C may be received at the first protection interface 508C. The first downstream protection digital signal 517C may be transmitted to the first wireless controller 509C. The first wireless controller 509C may encapsulate the first downstream protection digital signal 517C into a first downstream protection digital packet 518C, and transmit the first downstream protection digital packet 518C to the first modem 510C. The first modem 510C may convert the first downstream protection digital packet 518C into the first downstream protection IF signal 516C, and transmit the first downstream protection IF signal 516C to the first IF combiner 511C.

In some embodiment, the first 60 GHz RF signal 520C may be received at a second 60 GHz antenna 521C of the second radio unit 502C. The second 60 GHz antenna 521C may transmit the received first 60 GHz RF signal 520C to a second transceiver 522C of the second radio unit 502C. The second transceiver 522C may amplify the received first 60 GHz RF signal 520C, and convert the received first 60 GHz RF signal 520C into a second upstream combined IF signal 523C. The second upstream combined IF signal 523C may be transmitted to a second IF splitter 524C of the second radio unit 502C. The second IF splitter 524C may extract a second upstream XPIC IF signal 525C from the second upstream combined IF signal 523C, and transmit the second upstream XPIC IF signal 525C to a second demodulator 526C of the second radio unit 502C. The second demodulator 526C may use the second upstream XPIC IF signal 525C to cancel interference of the vertical polarization in the second downstream XPIC IF signal 537C.

In some embodiment, the first 60 GHz RF signal 520C may be received at a third 60 GHz antenna 527C of the third radio unit 503C. The third 60 GHz antenna 527C may transmit the received first 60 GHz RF signal 520C to a third transceiver 528C of the third radio unit 503C. The third transceiver 528C may amplify the received first 60 GHz RF signal 520C, and convert the received first 60 GHz RF signal 520C into a third upstream combined IF signal 529C. The third upstream combined IF signal 529C may be transmitted to a third IF splitter 530C of the third radio unit 503C. The third IF splitter 530C may extract a third upstream protection IF signal 531C from the third upstream combined IF signal 529C.

In some embodiment, the third upstream protection IF signal 531C may be transmitted to a third modem 532C of the third radio unit 503C. The third modem 532C may convert the third upstream protection IF signal 531C into a third upstream protection digital packet 533C, and transmit the third upstream protection digital packet 533C to a third wireless controller 534C of the third radio unit 503C. The third wireless controller 534C may decapsulate the third upstream protection digital packet 533C, and convert the third upstream protection digital packet 533C into a third upstream protection digital signal 535C. The third upstream protection digital signal 535C may be transmitted to a third protection interface 536C of the third radio unit 503C.

In some embodiment, the first wireless controller 509C of the first radio unit 501C may encapsulate the first downstream protection digital signal 517C into the first downstream protection digital packet 518C addressed to a destination radio unit. The third wireless controller 534C of the third radio unit 503C may decapsulate the third upstream protection digital packet 533C, accept only the upstream protection digital packet addressed to the destination radio unit that includes the third wireless controller 534C, and convert the accepted upstream protection digital packet into the third upstream protection digital signal 535C.

In some embodiment, the first radio unit 501C and the third radio unit 503C may be configured to operate as a vertical polarization protection pair, and the second radio unit 502C and the fourth radio unit 504C may be configured to operate as a horizontal polarization protection pair.

In some embodiment, the first radio unit 501C and the second radio unit 502C may be configured as a first XPIC pair, and the third radio unit 503C and the fourth radio unit 504C may be configured as a second XPIC pair.

In some embodiment, the first downstream XPIC IF signal 515C and the second downstream XPIC IF signal 537C are configured to use different carrier frequencies within the license-free 60 GHz band.

In some embodiment, a protection interconnection within any one of the vertical polarization protection pair and the horizontal polarization protection pair and an XPIC interconnection within any one of the first XPIC pair and the second XPIC pair are configured to use different channels allocated within the license-free 60 GHz band.

Figure 13:
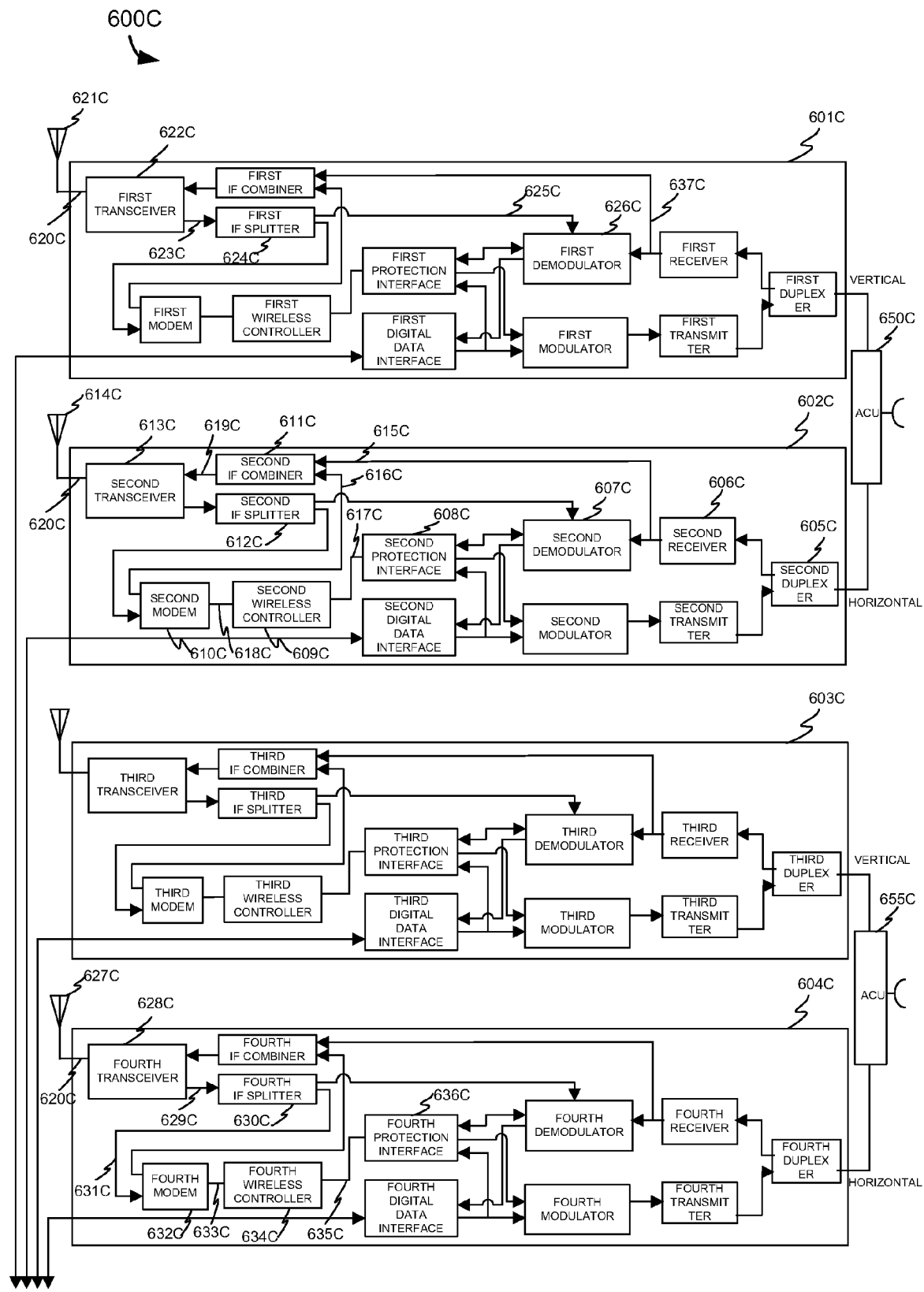
FIG. 13 illustrates another exemplary embodiment of an all outdoor radios system configured with a protection system and an XPIC application using a wireless channel operating at a license-free 60 GHz band in accordance with the present invention.

FIG. 13 illustrates another exemplary embodiment of an all outdoor radios system configured with a protection system and an XPIC application using a wireless channel operating at a license-free 60 GHz band in accordance with the present invention. In the exemplary embodiment 600C, the all outdoor radios system configured with a protection system and an XPIC application using a wireless channel operating at a license-free 60 GHz band may include: a first radio unit 601C configured to use vertical polarization, a second radio unit 602C configured to use horizontal polarization, a third radio unit 603C configured to use vertical polarization, and a fourth radio unit 604C configured to use horizontal polarization. The first radio unit 601C and the second radio unit 602C are communicatively coupled to an ACU 650C and the third radio unit 603C and the fourth radio unit 604C are communicatively coupled to an ACU 655C, respectively. The second radio unit 602C may include a second duplexer 605C, a second receiver 606C, a second demodulator 607C, a second protection interface 608C, a second wireless controller 609C, a second modem 610C, a second IF combiner 611C, a second IF splitter 612C, a second transceiver 613C, and a second 60 GHz antenna 614C. A second downstream XPIC IF signal 615C and a second downstream protection IF signal 616C may be received at the second IF combiner 611C. The second IF combiner 611C may combine the second downstream XPIC IF signal 615C and the second downstream protection IF signal 616C, and generate a second downstream combined IF signal 619C. The second downstream combined IF signal 619C may be transmitted to the second transceiver 613C. The second transceiver 613 may convert the second downstream combined IF signal 619C into a second 60 GHz RF signal 620C, and amplify the second 60 GHz RF signal 620C. The amplified second 60 GHz RF signal 620C may be transmitted to a second 60 GHz antenna 614C connected to the second transceiver 613C.

In some embodiment, a second downstream protection digital signal 617C may be received at the second protection interface 608C. The second downstream protection digital signal 617C may be transmitted to the second wireless controller 609C. The second wireless controller 609C may encapsulate the second downstream protection digital signal 617C into a second downstream protection digital packet 618C, and transmit the second downstream protection digital packet 618C to the second modem 610C. The second modem 610C may convert the second downstream protection digital packet 618C into the second downstream protection IF signal 616C, and transmit the second downstream protection IF signal 616C to the first IF combiner 611C.

In some embodiment, the second 60 GHz RF signal 620C may be received at a first 60 GHz antenna 621C of the first radio unit 601C. The first 60 GHz antenna 621C may transmit the received second 60 GHz RF signal 620C to a first transceiver 622C of the first radio unit 601C. The first transceiver 622C may amplify the received second 60 GHz RF signal 620C, and convert the received second 60 GHz RF signal 620C into a first upstream combined IF signal 623C. The first upstream combined IF signal 623C may be transmitted to a first IF splitter 624C of the first radio unit 601C. The first IF splitter 624C may extract a first upstream XPIC IF signal 625C from the first upstream combined IF signal 623C, and transmit the first upstream XPIC IF signal 625C to a first demodulator 626C of the first radio unit 601C. The first demodulator 626C may use the first upstream XPIC IF signal 625C to cancel interference of the horizontal polarization in the first downstream XPIC IF signal 637C.

In some embodiment, the second 60 GHz RF signal 620C may be received at a fourth 60 GHz antenna 627C of the fourth radio unit 604C. The fourth 60 GHz antenna 627C may transmit the received first 60 GHz RF signal 620C to a fourth transceiver 628C of the fourth radio unit 604C. The fourth transceiver 628C may amplify the received first 60 GHz RF signal 620C, and convert the received first 60 GHz RF signal 620C into a fourth upstream combined IF signal 629C. The fourth upstream combined IF signal 629C may be transmitted to a fourth IF splitter 630C of the fourth radio unit 604. The fourth IF splitter 630C may extract a fourth upstream protection IF signal 631C from the fourth upstream combined IF signal 629C.

In some embodiment, the fourth upstream protection IF signal 631C may be transmitted to a fourth modem 632C of the fourth radio unit 604C. The fourth modem 632C may convert the fourth upstream protection IF signal 631C into a fourth upstream protection digital packet 633C, and transmit the fourth upstream protection digital packet 633C to a fourth wireless controller 634C of the fourth radio unit 604C. The fourth wireless controller 634C may decapsulate the fourth upstream protection digital packet 633C, and convert the fourth upstream protection digital packet 633C into a fourth upstream protection digital signal 635C. The fourth upstream protection digital signal 635C may be transmitted to a fourth protection interface 636C of the fourth radio unit 604C.

In some embodiment, the second wireless controller 609C of the second radio unit 602C may encapsulate the second downstream protection digital signal 617C into the second downstream protection digital packet 618C addressed to a destination radio unit. The fourth wireless controller 634C of the fourth radio unit 604C may decapsulate the fourth upstream protection digital packet 633C, accept only the upstream protection digital packet addressed to the destination radio unit that includes the fourth wireless controller 634C, and convert the accepted upstream protection digital packet into the fourth upstream protection digital signal 635C.

In some embodiment, the first radio unit 601C and the third radio unit 603C may be configured to operate as a vertical polarization protection pair, and the second radio unit 602C and the fourth radio unit 604C may be configured to operate as a horizontal polarization protection pair.

In some embodiment, the first radio unit 601C and the second radio unit 602C may be configured as a first XPIC pair, and the third radio unit 603C and the fourth radio unit 604C may be configured as a second XPIC pair.

In some embodiment, the first downstream XPIC IF signal 637C and the second downstream XPIC IF signal 615C are configured to use different carrier frequencies within the license-free 60 GHz band.

In some embodiment, a protection interconnection within any one of the vertical polarization protection pair and the horizontal polarization protection pair and an XPIC interconnection within any one of the first XPIC pair and the second XPIC pair are configured to use different channels allocated within the license-free 60 GHz band.

Figure 14:
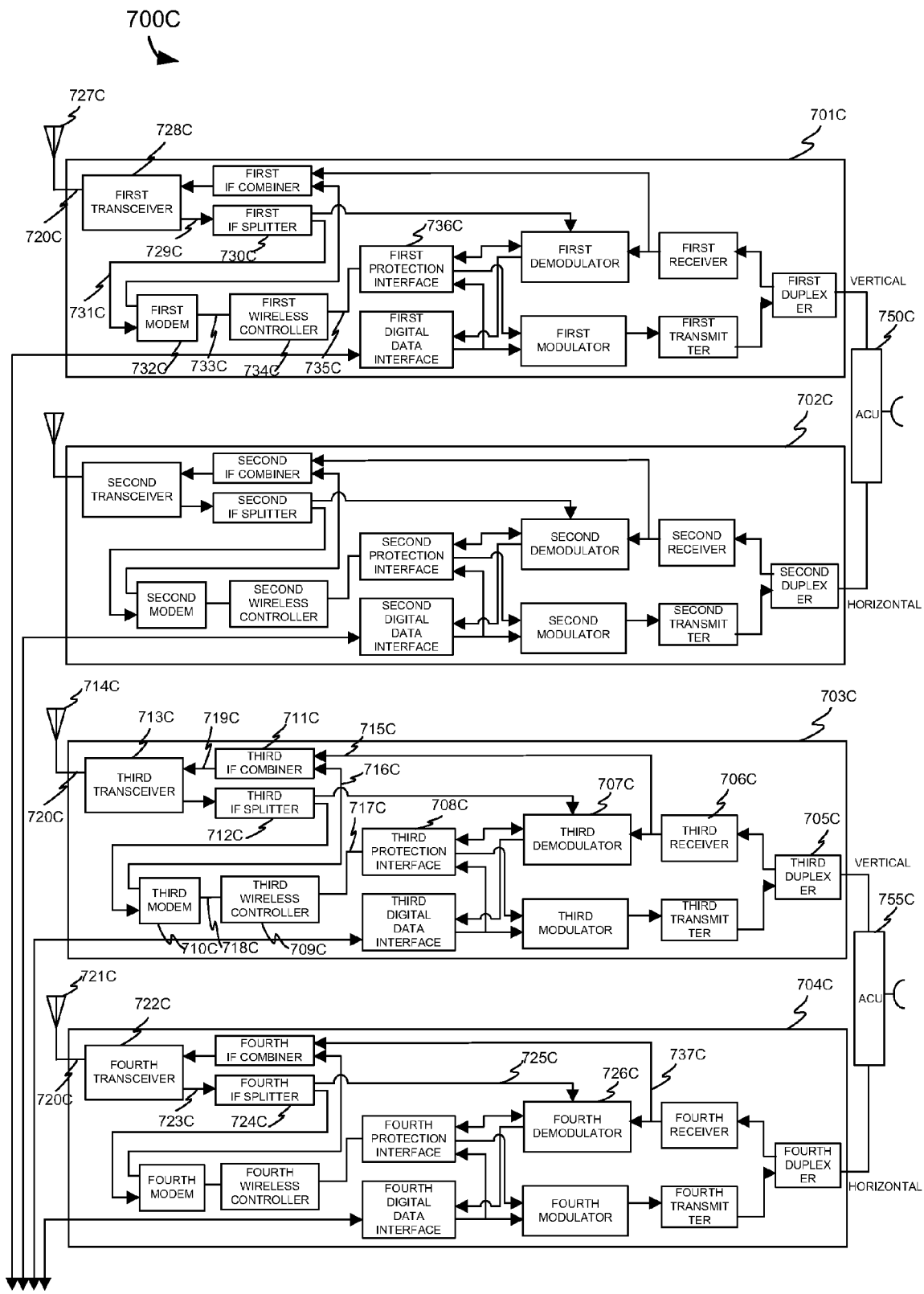
FIG. 14 illustrates yet another exemplary embodiment of an all outdoor radios system configured with a protection system and an XPIC application using a wireless channel operating at a license-free 60 GHz band in accordance with the present invention.

FIG. 14 illustrates yet another exemplary embodiment of an all outdoor radios system configured with a protection system and an XPIC application using a wireless channel operating at a license-free 60 GHz band in accordance with the present invention. In the exemplary embodiment 700C, the all outdoor radios system configured with a protection system and an XPIC application using a wireless channel operating at a license-free 60 GHz band may include: a first radio unit 701C configured to use vertical polarization, a second radio unit 702C configured to use horizontal polarization, a third radio unit 703C configured to use vertical polarization, and a fourth radio unit 704C configured to use horizontal polarization. The first radio unit 701C and the second radio unit 702C are communicatively coupled to an ACU 750C and the third radio unit 703C and the fourth radio unit 704C are communicatively coupled to an ACU 755C, respectively. The third radio unit 703C may include a third duplexer 705C, a third receiver 706C, a third demodulator 707C, a third protection interface 708C, a third wireless controller 709C, a third modem 710C, a third IF combiner 711C, a third IF splitter 712C, a third transceiver 713C, and a third 60 GHz antenna 714C. A third downstream XPIC IF signal 715C and a third downstream protection IF signal 716C may be received at the third IF combiner 711C. The third IF combiner 711C may combine the third downstream XPIC IF signal 715C and the third downstream protection IF signal 716C, and generate a third downstream combined IF signal 719C. The third downstream combined IF signal 719C may be transmitted to the third transceiver 713C. The third transceiver 713C may convert the third downstream combined IF signal 719C into a third 60 GHz RF signal 720C, and amplify the third 60 GHz RF signal 720C. The amplified third 60 GHz RF signal 720C may be transmitted to a third 60 GHz antenna 714C connected to the third transceiver 713C.

In some embodiment, a third downstream protection digital signal 717C may be received at the third protection interface 708C. The third downstream protection digital signal 717C may be transmitted to the third wireless controller 709C. The third wireless controller 709C may encapsulate the third downstream protection digital signal 717C into a third downstream protection digital packet 718C, and transmit the third downstream protection digital packet 718C to the third modem 710C. The third modem 710C may convert the third downstream protection digital packet 718C into the third downstream protection IF signal 716C, and transmit the third downstream protection IF signal 716C to the third IF combiner 711C.

In some embodiment, the third 60 GHz RF signal 720C may be received at a fourth 60 GHz antenna 721C of the fourth radio unit 704C. The fourth 60 GHz antenna 721C may transmit the received third 60 GHz RF signal 720C to a fourth transceiver 722C of the fourth radio unit 704C. The fourth transceiver 722C may amplify the received third 60 GHz RF signal 720C, and convert the received third 60 GHz RF signal 720C into a fourth upstream combined IF signal 723C. The fourth upstream combined IF signal 723C may be transmitted to a fourth IF splitter 724C of the fourth radio unit 704C. The fourth IF splitter 724C may extract a fourth upstream XPIC IF signal 725C from the fourth upstream combined IF signal 723C, and transmit the fourth upstream XPIC IF signal 725C to a fourth demodulator 726C of the fourth radio unit 704C. The fourth demodulator 726C may use the fourth upstream XPIC IF signal 725C to cancel interference of the vertical polarization in the fourth downstream XPIC IF signal 737C.

In some embodiment, the third 60 GHz RF signal 720C may be received at a first 60 GHz antenna 727C of the first radio unit 701C. The first 60 GHz antenna 727C may transmit the received third 60 GHz RF signal 720C to a first transceiver 728C of the first radio unit 701C. The first transceiver 728C may amplify the received third 60 GHz RF signal 720C, and convert the received third 60 GHz RF signal 720C into a first upstream combined IF signal 729C. The first upstream combined IF signal 729C may be transmitted to a first IF splitter 730C of the first radio unit 701C. The first IF splitter 730C may extract a first upstream protection IF signal 731C from the first upstream combined IF signal 729C.

In some embodiment, the first upstream protection IF signal 731C may be transmitted to a first modem 732C of the first radio unit 701C. The first modem 732C may convert the first upstream protection IF signal 731C into a first upstream protection digital packet 733C, and transmit the first upstream protection digital packet 733C to a first wireless controller 734C of the first radio unit 701C. The first wireless controller 734C decapsulates the first upstream protection digital packet 733C, and converts the first upstream protection digital packet 733C into a first upstream protection digital signal 735C. The first upstream protection digital signal 735C may be transmitted to a first protection interface 736C of the first radio unit 701C.

In some embodiment, the third wireless controller 709C of the third radio unit 703C may encapsulate the third downstream protection digital signal 717C into the third downstream protection digital packet 718C addressed to a destination radio unit. The first wireless controller 734C of the first radio unit 701C may decapsulate the first upstream protection digital packet 733C, accept only the upstream protection digital packet addressed to the destination radio unit that includes the first wireless controller 734C, and convert the accepted upstream protection digital packet into the first upstream protection digital signal 735C.

In some embodiment, the first radio unit 701C and the third radio unit 703C may be configured to operate as a vertical polarization protection pair, and the second radio unit 702C and the fourth radio unit 704C may be configured to operate as a horizontal polarization protection pair.

In some embodiment, the first radio unit 701C and the second radio unit 702C may be configured as a first XPIC pair, and the third radio unit 703C and the fourth radio unit 704C may be configured as a second XPIC pair.

In some embodiment, the third downstream XPIC IF signal 715C and the fourth downstream XPIC IF signal 737C are configured to use different carrier frequencies within the license-free 60 GHz band.

In some embodiment, a protection interconnection within any one of the vertical polarization protection pair and the horizontal polarization protection pair and an XPIC interconnection within any one of the first XPIC pair and the second XPIC pair are configured to use different channels allocated within the license-free 60 GHz band.

Figure 15:
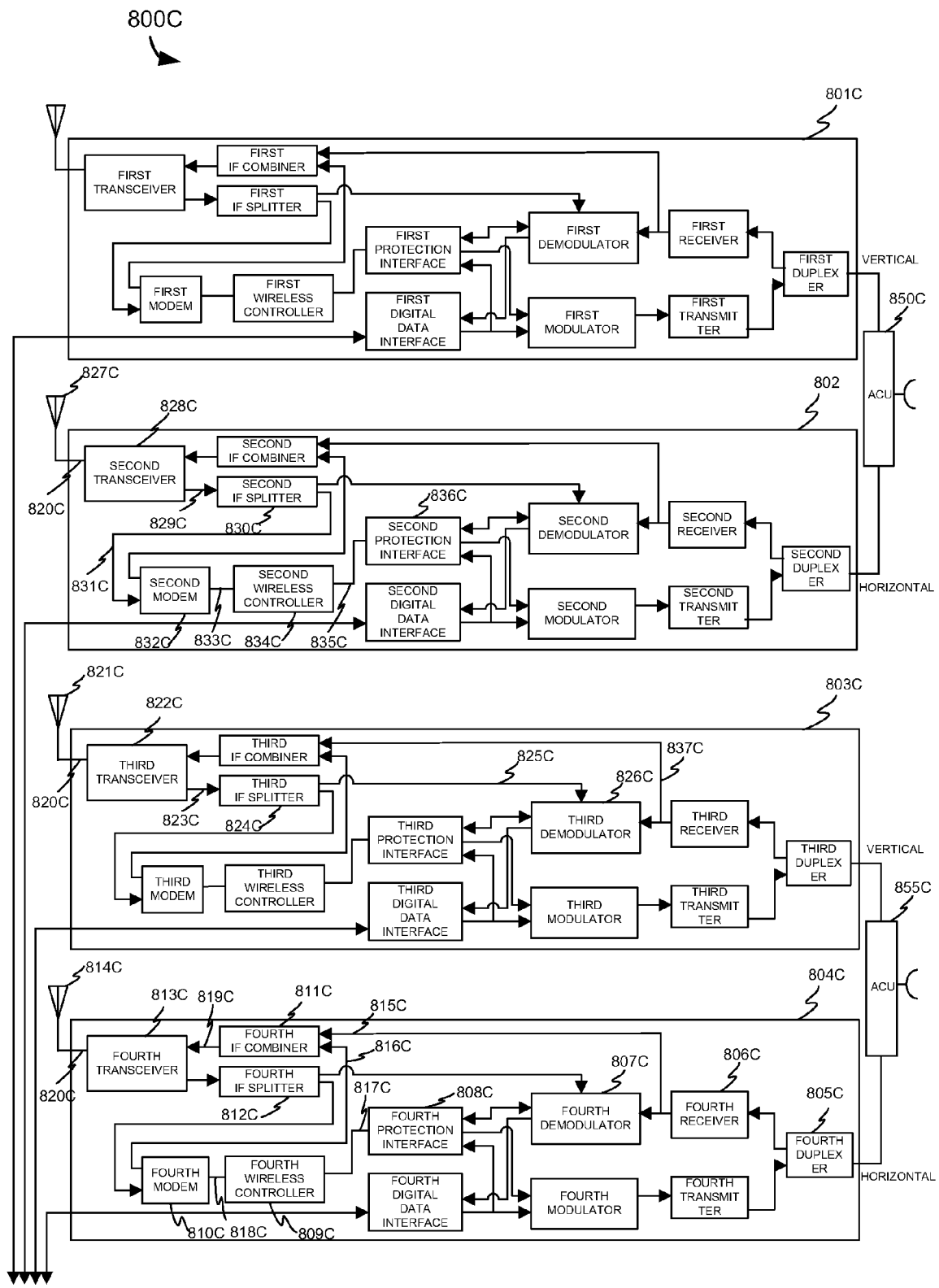
FIG. 15 illustrates yet another exemplary embodiment of an all outdoor radios system configured with a protection system and an XPIC application using a wireless channel operating at a license-free 60 GHz band in accordance with the present invention.

FIG. 15 illustrates yet another exemplary embodiment of an all outdoor radios system configured with a protection system and an XPIC application using a wireless channel operating at a license-free 60 GHz band in accordance with the present invention. In the exemplary embodiment 800C, the all outdoor radios system configured with a protection system and an XPIC application using a wireless channel operating at a license-free 60 GHz band may include: a first radio unit 801C configured to use vertical polarization, a second radio unit 802C configured to use horizontal polarization, a third radio unit 803C configured to use vertical polarization, and a fourth radio unit 804C configured to use horizontal polarization. The first radio unit 801C and the second radio unit 802C are communicatively coupled to an ACU 850C and the third radio unit 803C and the fourth radio unit 804C are communicatively coupled to an ACU 855C, respectively. The fourth radio unit 804C may include a fourth duplexer 805C, a fourth receiver 806C, a fourth demodulator 807C, a fourth protection interface 808C, a fourth wireless controller 809C, a fourth modem 810C, a fourth IF combiner 811C, a fourth IF splitter 812C, a fourth transceiver 813C, and a fourth 60 GHz antenna 814C. A fourth downstream XPIC IF signal 815C and a fourth downstream protection IF signal 816C may be received at the fourth IF combiner 811C. The fourth IF combiner 811C may combine the fourth downstream XPIC IF signal 815C and the fourth downstream protection IF signal 816C, and generate a fourth downstream combined IF signal 819C. The fourth downstream combined IF signal 819C may be transmitted to the fourth transceiver 813C. The fourth transceiver 813 may convert the fourth downstream combined IF signal 819C into a fourth 60 GHz RF signal 820C, and amplify the fourth 60 GHz RF signal 820C. The amplified fourth 60 GHz RF signal 820C may be transmitted to a fourth 60 GHz antenna 814C connected to the fourth transceiver 813C.

In some embodiment, a fourth downstream protection digital signal 817C may be received at the fourth protection interface 808C. The fourth downstream protection digital signal 817C may be transmitted to the fourth wireless controller 809C. The fourth wireless controller 809C may encapsulate the fourth downstream protection digital signal 817C into a fourth downstream protection digital packet 818C, and transmit the fourth downstream protection digital packet 818C to the fourth modem 810C. The fourth modem 810C may convert the fourth downstream protection digital packet 818C into the fourth downstream protection IF signal 816C, and transmit the fourth downstream protection IF signal 816C to the first IF combiner 811C.

In some embodiment, the fourth 60 GHz RF signal 820C may be received at a third 60 GHz antenna 821C of the third radio unit 803C. The third 60 GHz antenna 821C may transmit the received fourth 60 GHz RF signal 820C to a third transceiver 822C of the third radio unit 803C. The third transceiver 822C may amplify the received fourth 60 GHz RF signal 820C, and convert the received fourth 60 GHz RF signal 820C into a third upstream combined IF signal 823C. The third upstream combined IF signal 823C may be transmitted to a third IF splitter 824C of the third radio unit 803C. The third IF splitter 824C may extract a third upstream XPIC IF signal 825C from the third upstream combined IF signal 823C, and transmit the third upstream XPIC IF signal 825C to a third demodulator 826C of the third radio unit 803C. The third demodulator 826C may use the third upstream XPIC IF signal 825C to cancel interference of the horizontal polarization in the third downstream XPIC IF signal 837C.

In some embodiment, the fourth 60 GHz RF signal 820C may be received at a second 60 GHz antenna 827C of the second radio unit 802C. The second 60 GHz antenna 827C may transmit the received fourth 60 GHz RF signal 820C to a second transceiver 828C of the second radio unit 802C. The second transceiver 828C may amplify the received second 60 GHz RF signal 820C, and convert the received fourth 60 GHz RF signal 820C into a second upstream combined IF signal 829C. The second upstream combined IF signal 829C may be transmitted to a second IF splitter 830C of the second radio unit 802C. The second IF splitter 830C may extract a second upstream protection IF signal 831C from the second upstream combined IF signal 829C.

In some embodiment, the second upstream protection IF signal 831C may be transmitted to a second modem 832C of the second radio unit 802C. The second modem 832C may convert the second upstream protection IF signal 831C into a second upstream protection digital packet 833C, and transmit the second upstream protection digital packet 833C to a second wireless controller 834C of the second radio unit 802C. The second wireless controller 834C decapsulates the second upstream protection digital packet 833C, and converts the second upstream protection digital packet 833C into a second upstream protection digital signal 835C. The second upstream protection digital signal 835C may be transmitted to a second protection interface 836C of the second radio unit 802C.

In some embodiment, the fourth wireless controller 809C of the fourth radio unit 804C may encapsulate the fourth downstream protection digital signal 817C into the fourth downstream protection digital packet 818C addressed to a destination radio unit. The second wireless controller 834C of the second radio unit 802C may decapsulate the second upstream protection digital packet 833C, accept only the upstream protection digital packet addressed to the destination radio unit that includes the second wireless controller 834C, and convert the accepted upstream protection digital packet into the second upstream protection digital signal 835C.

In some embodiment, the first radio unit 801C and the third radio unit 803C may be configured to operate as a vertical polarization protection pair, and the second radio unit 802C and the fourth radio unit 804C may be configured to operate as a horizontal polarization protection pair.

In some embodiment, the first radio unit 801C and the second radio unit 802C may be configured as a first XPIC pair, and the third radio unit 803C and the fourth radio unit 804C may be configured as a second XPIC pair.

In some embodiment, the third downstream XPIC IF signal 837C and the fourth downstream XPIC IF signal 815C are configured to use different carrier frequencies within the license-free 60 GHz band.

In some embodiment, a protection interconnection within any one of the vertical polarization protection pair and the horizontal polarization protection pair and an XPIC interconnection within any one of the first XPIC pair and the second XPIC pair are configured to use different channels allocated within the license-free 60 GHz band.

Figure 16:
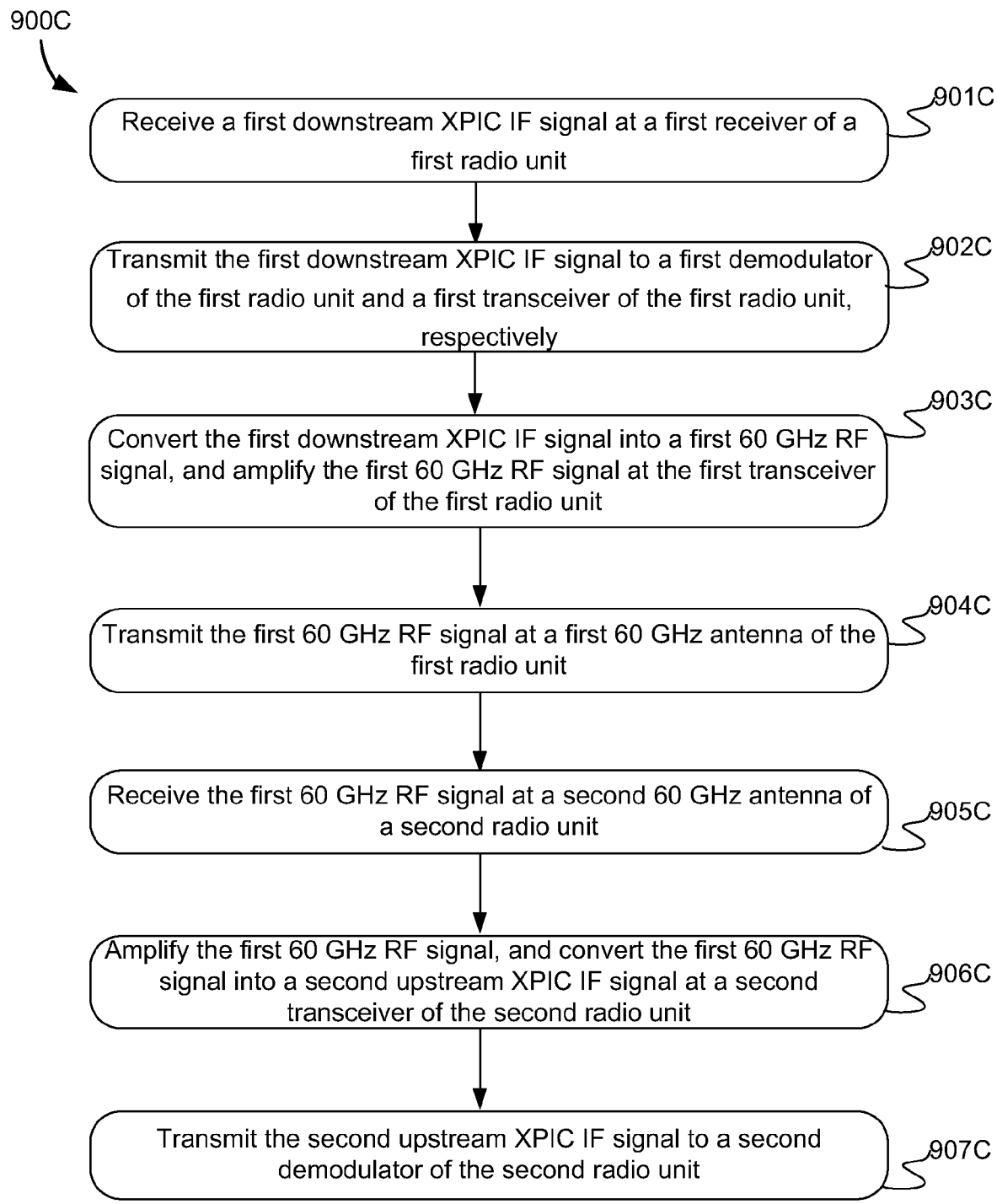
FIG. 16 illustrates an exemplary method performed by an all outdoor radios system configured with an XPIC application using a wireless channel operating at a license-free 60 GHz band in accordance with the present invention.

FIG. 16 illustrates an exemplary method performed by an all outdoor radios system configured with an XPIC application using a wireless channel operating at a license-free 60 GHz band in accordance with the present invention. The method includes: step 901C for receiving a first downstream XPIC IF signal at a first receiver of a first radio unit; step 902C for transmitting the first downstream XPIC IF signal to a first demodulator of the first radio unit and a first transceiver of the first radio unit, respectively; step 903C for converting the first downstream XPIC IF signal into a first 60 GHz RF signal, and amplifying the first 60 GHz RF signal at the first transceiver of the first radio unit; step 904C for transmitting the first 60 GHz RF signal at a first 60 GHz antenna of the first radio unit; step 905C for receiving the first 60 GHz RF signal at a second 60 GHz antenna of a second radio unit; step 906C for amplifying the first 60 GHz RF signal, and converting the first 60 GHz RF signal into a second upstream XPIC IF signal at a second transceiver of the second radio unit; and step 907C for transmitting the second upstream XPIC IF signal to a second demodulator of the second radio unit.

Figure 17:
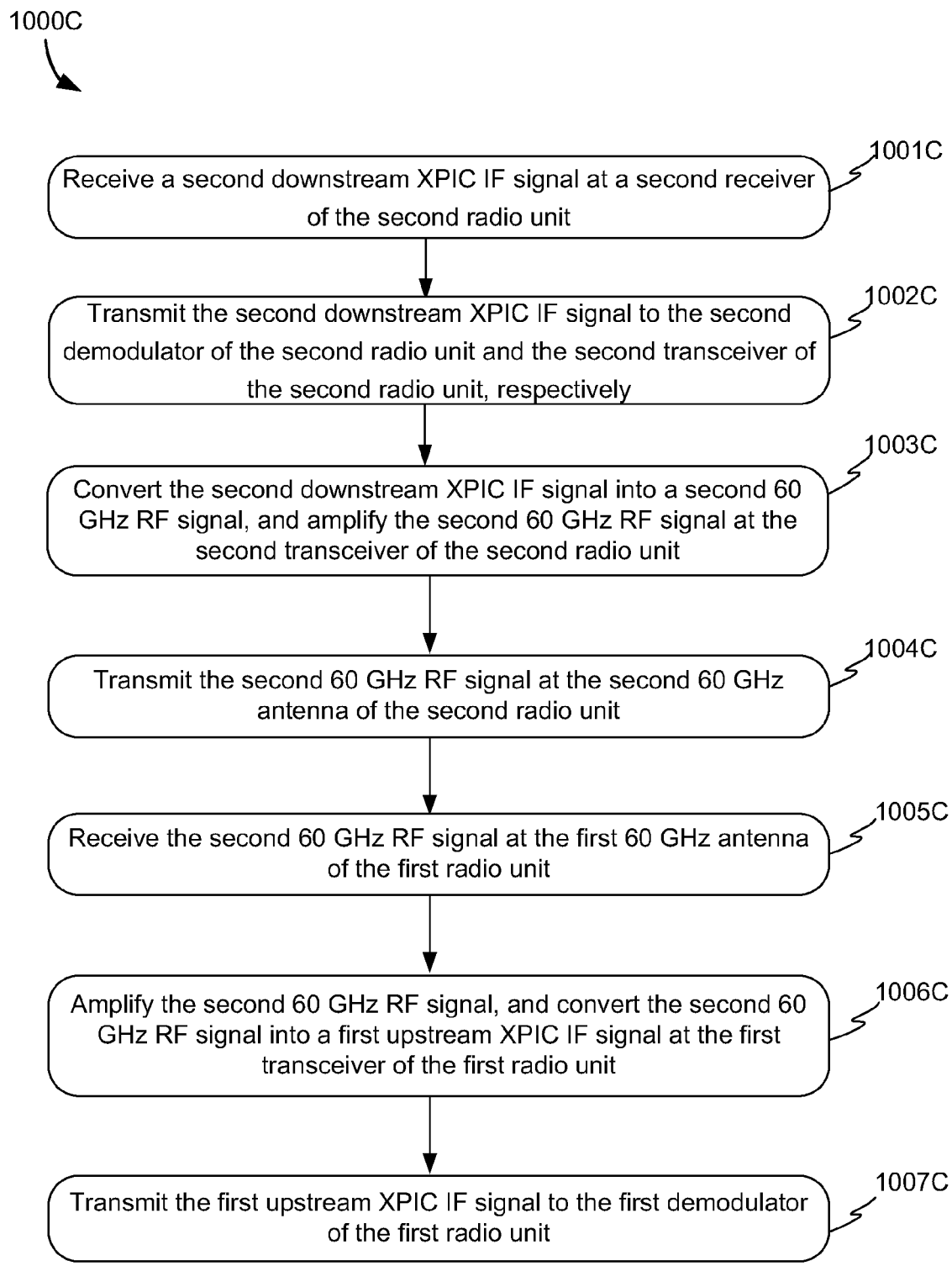
FIG. 17 illustrates another exemplary method performed by an all outdoor radios system configured with an XPIC application using a wireless channel operating at a license-free 60 GHz band in accordance with the present invention.

FIG. 17 illustrates another exemplary method performed by an all outdoor radios system configured with an XPIC application using a wireless channel operating at a license-free 60 GHz band in accordance with the present invention. The method includes: step 1001C for receiving a second downstream XPIC IF signal at a second receiver of the second radio unit; step 1002C for transmitting the second downstream XPIC IF signal to the second demodulator of the second radio unit and the second transceiver of the second radio unit, respectively; step 1003C for converting the second downstream XPIC IF signal into a second 60 GHz RF signal, and amplifying the second 60 GHz RF signal at the second transceiver of the second radio unit; step 1004C for transmitting the second 60 GHz RF signal at the second 60 GHz antenna of the second radio unit; step 1005C for receiving the second 60 GHz RF signal at the first 60 GHz antenna of the first radio unit; step 1006C for amplifying the second 60 GHz RF signal, and converting the second 60 GHz RF signal into a first upstream XPIC IF signal at the first transceiver of the first radio unit; and step 1007C for transmitting the first upstream XPIC IF signal to the first demodulator of the first radio unit.

Figure 18:
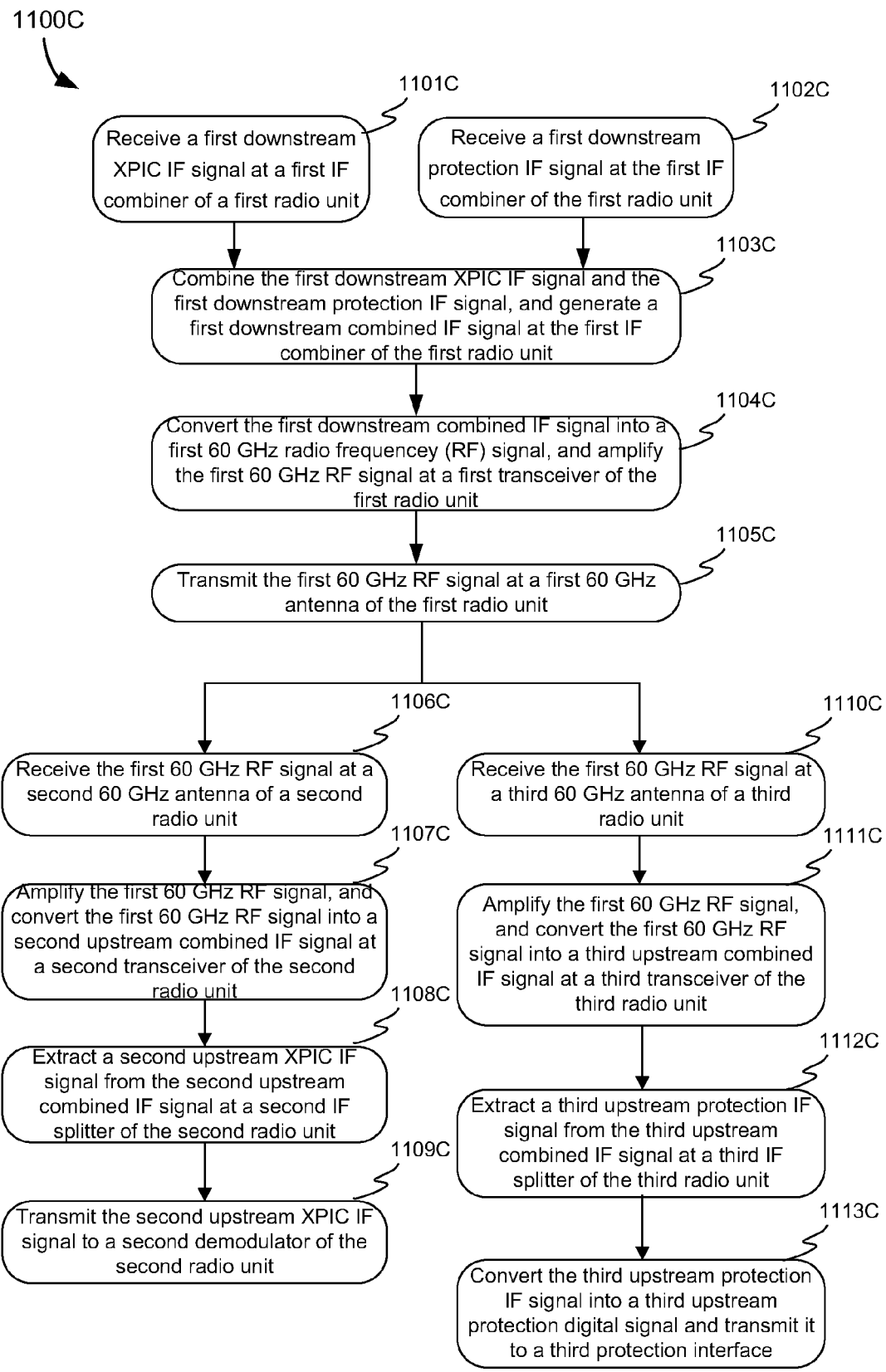
FIG. 18 illustrates an exemplary method performed by an all outdoor radios system configured with a protection system and an XPIC application using a wireless channel operating at a license-free 60 GHz band in accordance with the present invention.

FIG. 18 illustrates an exemplary method performed by an all outdoor radios system configured with a protection system and an XPIC application using a wireless channel operating at a license-free 60 GHz band in accordance with the present invention. The method includes: step 1101C for receiving a first downstream XPIC IF signal at a first IF combiner of a first radio unit; step 1102C for receiving a first downstream protection IF signal at the first IF combiner of the first radio unit; step 1103C for combining the first downstream XPIC IF signal and the first downstream protection IF signal, and generating a first downstream combined IF signal at the first IF combiner of the first radio unit; step 1104C for converting the first downstream combined IF signal into a first 60 GHz RF signal, and amplifying the first 60 GHz RF signal at a first transceiver of the first radio unit; step 1105C for transmitting the first 60 GHz RF signal at a first 60 GHz antenna of the first radio unit; step 1106C for receiving the first 60 GHz RF signal at a second 60 GHz antenna of a second radio unit; step 1107C for amplifying the first 60 GHz RF signal, and converting the first 60 GHz RF signal into a second upstream combined IF signal at a second transceiver of the second radio unit; step 1108C for extracting a second upstream XPIC IF signal from the second upstream combined IF signal at a second IF splitter of the second radio unit; step 1109C for transmitting the second upstream XPIC IF signal to a second demodulator of the second radio unit; step 1110C for receiving the first 60 GHz RF signal at a third 60 GHz antenna of a third radio unit; step 1111C for amplifying the first 60 GHz RF signal, and converting the first 60 GHz RF signal into a third upstream combined IF signal at a third transceiver of the third radio unit; step 1112C for extracting a third upstream protection IF signal from the third upstream combined IF signal at a third IF splitter of the third radio unit; and step 1113C for converting the third upstream protection IF signal into a third upstream protection digital signal and transmit it to a third protection interface.

Figure 19:
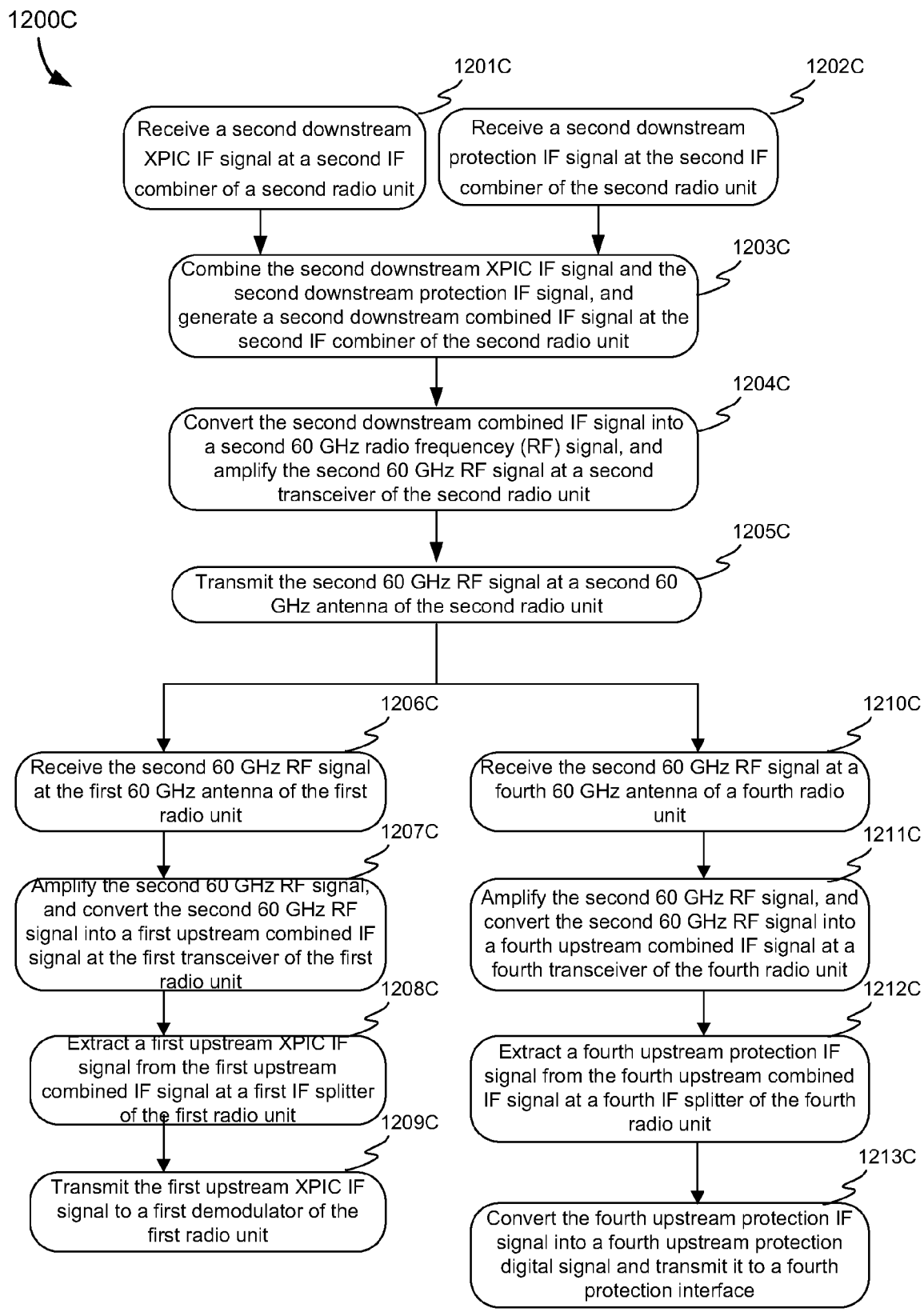
FIG. 19 illustrates another exemplary method performed by an all outdoor radios system configured with a protection system and an XPIC application using a wireless channel operating at a license-free 60 GHz band in accordance with the present invention.

FIG. 19 illustrates another exemplary method performed by an all outdoor radios system configured with a protection system and an XPIC application using a wireless channel operating at a license-free 60 GHz band in accordance with the present invention. The method includes: step 1201C for receiving a second downstream XPIC IF signal at a second IF combiner of the second radio unit; step 1202C for receiving a second downstream protection IF signal at the second IF combiner of the second radio unit; step 1203C for combining the second downstream XPIC IF signal and the second downstream protection IF signal, and generating a second downstream combined IF signal at a second IF combiner of the second radio unit; step 1204C for converting the second downstream combined IF signal into a second 60 GHz RF signal, and amplifying the second 60 GHz RF signal at the second transceiver of the second radio unit; step 1205C for transmitting the second 60 GHz RF signal at the second antenna of the second radio unit; step 1206C for receiving the second 60 GHz RF signal at the first antenna of the first radio unit; step 1207C for amplifying the second 60 GHz RF signal, and converting the second 60 GHz RF signal into a first upstream combined IF signal at the first transceiver of the first radio unit; step 1208C for extracting a first upstream XPIC IF signal from the first upstream combined IF signal at a first IF splitter of the first radio unit; step 1209C for transmitting the first upstream XPIC IF signal to a first demodulator of the first radio unit; step 1210C for receiving the second 60 GHz RF signal at a fourth antenna of a fourth radio unit; step 1211C for amplifying the second 60 GHz RF signal, and converting the second 60 GHz RF signal into a fourth upstream combined IF signal at a fourth transceiver of the fourth radio unit; step 1212C for extracting a fourth upstream protection IF signal from the fourth upstream combined IF signal at a fourth IF splitter of the fourth radio unit; and step 1213C for converting the fourth upstream protection IF signal into a fourth upstream protection digital signal and transmit it to a fourth protection interface.

Figure 20:
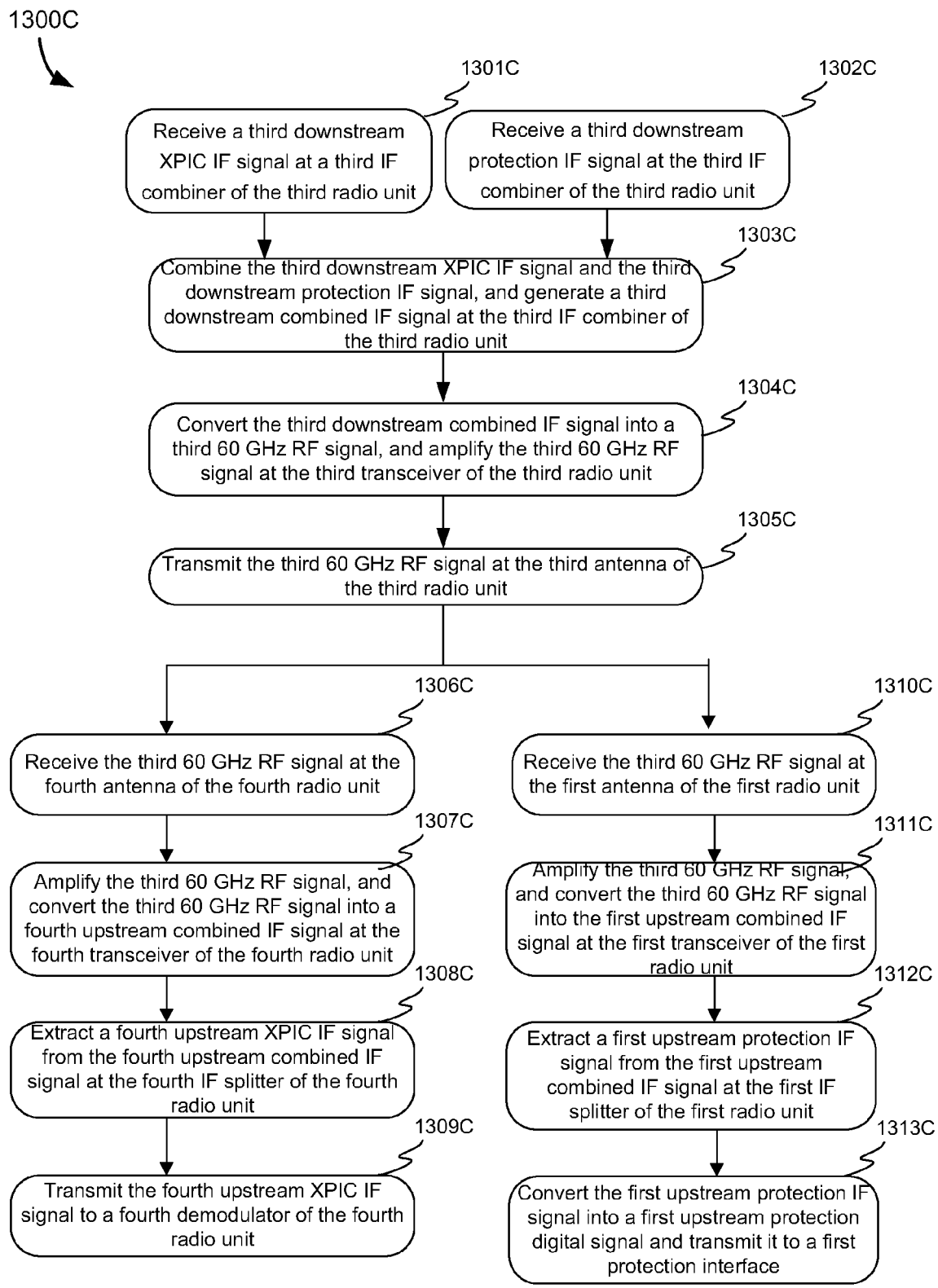
FIG. 20 illustrates yet another exemplary method performed by an all outdoor radios system configured with a protection system and an XPIC application using a wireless channel operating at a license-free 60 GHz band in accordance with the present invention.

FIG. 20 illustrates yet another exemplary method performed by an all outdoor radios system configured with a protection system and an XPIC application using a wireless channel operating at a license-free 60 GHz band in accordance with the present invention. The method includes: step 1301C for receiving a third downstream XPIC IF signal at a third IF combiner of the third radio unit; step 1302C for receiving a third downstream protection IF signal at the third IF combiner of the third radio unit; step 1303C for combining the third downstream XPIC IF signal and the third downstream protection IF signal, and generating a third downstream combined IF signal at the third IF combiner of the third radio unit; step 1304C for converting the third downstream combined IF signal into a third 60 GHz RF signal, and amplifying the third 60 GHz RF signal at the third transceiver of the third radio unit; step 1305C for transmitting the third 60 GHz RF signal at the third antenna of the third radio unit; step 1306C for receiving the third 60 GHz RF signal at the fourth antenna of the fourth radio unit; step 1307C for amplifying the third 60 GHz RF signal, and converting the third 60 GHz RF signal into a fourth upstream combined IF signal at the fourth transceiver of the fourth radio unit; step 1308C for extracting a fourth upstream XPIC IF signal from the fourth upstream combined IF signal at the fourth IF splitter of the fourth radio unit; step 1309C for transmitting the fourth upstream XPIC IF signal to a fourth demodulator of the fourth radio unit; step 1310C for receiving the third 60 GHz RF signal at the first antenna of the first radio unit; step 1311C for amplifying the third 60 GHz RF signal, and converting the third 60 GHz RF signal into the first upstream combined IF signal at the first transceiver of the first radio unit; step 1312C for extracting a first upstream protection IF signal from the first upstream combined IF signal at the first IF splitter of the first radio unit; and step 1313C for converting the first upstream protection IF signal into a first upstream protection digital signal and transmit it to a first protection interface.

Figure 21:
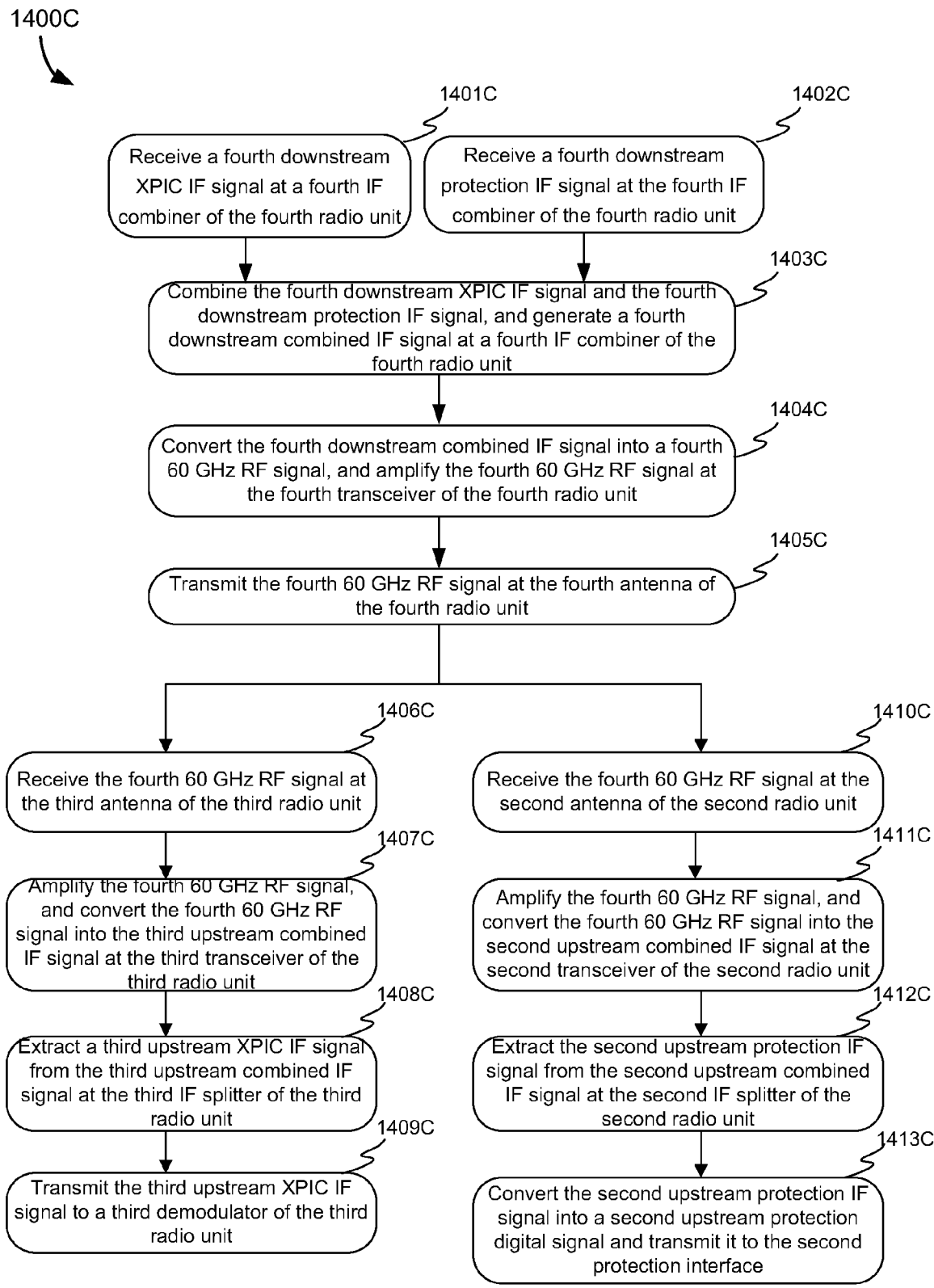
FIG. 21 illustrates yet another exemplary method performed by an all outdoor radios system configured with a protection system and an XPIC application using a wireless channel operating at a license-free 60 GHz band in accordance with the present invention.

FIG. 21 illustrates yet another exemplary method performed by an all outdoor radios system configured with a protection system and an XPIC application using a wireless channel operating at a license-free 60 GHz band in accordance with the present invention. The method includes: step 1401C for receiving a fourth downstream XPIC IF signal at a fourth IF combiner of the fourth radio unit; step 1402C for receiving a fourth downstream protection IF signal at the fourth IF combiner of the fourth radio unit; step 1403C for combining the fourth downstream XPIC IF signal and the fourth downstream protection IF signal, and generating a fourth downstream combined IF signal at a fourth IF combiner of the fourth radio unit; step 1404C for converting the fourth downstream combined IF signal into a fourth 60 GHz RF signal, and amplifying the fourth 60 GHz RF signal at the fourth transceiver of the fourth radio unit; step 1405C for transmitting the fourth 60 GHz RF signal at the fourth antenna of the fourth radio unit; step 1406C for receiving the fourth 60 GHz RF signal at the third antenna of the third radio unit; step 1407C for amplifying the fourth 60 GHz RF signal, and converting the fourth 60 GHz RF signal into the third upstream combined IF signal at the third transceiver of the third radio unit; step 1408C for extracting a third upstream XPIC IF signal from the third upstream combined IF signal at the third IF splitter of the third radio unit; step 1409C for transmitting the third upstream XPIC IF signal to a third demodulator of the third radio unit; step 1410C for receiving the fourth 60 GHz RF signal at the second antenna of the second radio unit; step 1411C for amplifying the fourth 60 GHz RF signal, and converting the fourth 60 GHz RF signal into the second upstream combined IF signal at the second transceiver of the second radio unit; step 1412C for extracting the second upstream protection IF signal from the second upstream combined IF signal at the second IF splitter of the second radio unit; and step 1413C for converting the second upstream protection IF signal into a second upstream protection digital signal and transmit it to a second protection interface.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:
1. An all outdoor radios link aggregation system using a wireless channel operating at a license-free 60 GHz band, comprising:
   a first radio unit including:
      a first digital data interface configured to receive an upstream digital data, and split the upstream digital data into at least a first sub-stream digital data and a second sub-stream digital data;
      a first rear-end modem configured to receive the first sub-stream digital data, and transmit the first sub-stream digital data to a first rear-end transceiver;
      a first digital wireless controller configured to receive the second sub-stream digital data, encapsulate the second sub-stream digital data into a second sub-stream data packet addressed to a first destination radio unit;

a first front-end modem configured to convert the second sub-stream data packet into a first downstream data intermediate frequency (IF) signal;

a first front-end transceiver configured to convert and amplify the first downstream data IF signal into a first 60 GHz radio frequency (RF) signal; and a first 60 GHz antenna configured to transmit the first 60 GHz RF signal; and at least a second radio unit including:

a second 60 GHz antenna configured to receive the first 60 GHz RF signal;

a second front-end transceiver configured to amplify the first 60 GHz RF signal, and convert the first 60 GHz RF signal into a second upstream data IF signal;

a second front-end modem configured to convert the second upstream data IF signal into a second upstream data packet;

a second wireless controller configured to decapsulate the second upstream data packet, accept the second upstream data packet if the second radio unit is the addressed first destination radio unit, and convert the second upstream data packet into a second upstream digital data;

a second digital data interface configured to receive the second upstream digital data; and a second rear-end modem and a second rear-end transceiver configured to transmit the second upstream digital data.

2. The system of claim 1, wherein:

the first digital data interface is further configured to receive a third sub-stream digital data;

the second digital data interface is further configured to receive a fourth sub-stream digital data;

the second wireless controller is further configured to encapsulate the fourth sub-stream digital data into a fourth sub-stream data packet addressed to a second destination radio unit;

the second front-end modem is further configured to convert the fourth sub-stream data packet into a second downstream data IF signal;

the second front-end transceiver is further configured to convert the second downstream data IF signal into a second 60 GHz radio RF signal, and amplify the second 60 GHz RF signal;

the second 60 GHz antenna is further configured to transmit the second 60 GHz RF signal;

the first 60 GHz antenna is further configured to receive the second 60 GHz RF signal;

the first front-end transceiver is further configured to amplify the second 60 GHz RF signal, and convert the second 60 GHz RF signal into a first upstream data IF signal;

the first front-end modem is further configured to convert the first upstream data IF signal into a first upstream data packet;

the first digital wireless controller is further configured to decapsulate the first upstream data packet, accept the first upstream data packet if the first radio unit is the addressed second destination radio unit, and convert the first upstream data packet into a first upstream digital data; and the first digital data interface is further configured to receive the first upstream digital data, aggregate the first upstream digital data and the third sub-stream digital data, reconstruct a first downstream user data, and transmit the first downstream user data.

3. The system of claim 1, wherein:

the first sub-stream digital data is configured with a data rate equal to or less than the throughput of the first radio unit, and the second sub-stream digital data is configured with a data rate equal to or less than the throughput of the second radio unit.

4. The system of claim 2, wherein:

the third sub-stream digital data is configured with a data rate equal to or less than the throughput of the first radio unit, and the fourth sub-stream digital data is configured with a data rate equal to or less than the throughput of the second radio unit.

5. The system of claim 1, wherein:

the first radio unit and the second radio unit are configured to connect in parallel to an antenna coupling unit.

6. The system of claim 1, wherein the first radio unit and the second radio unit are configured to operate at one selected from the group consisting of a hot standby manner, a space diversity manner, a frequency diversity manner, and a hybrid diversity manner.

7. An all outdoor radios system configured with a cross polarization interference cancellation (XPIC) application using a wireless channel operating at a license-free 60 GHz band, comprising:

an antenna coupling unit;

a first radio unit comprising:

a first receiver configured to receive a first downstream XPIC IF signal from a first duplexer;

a first demodulator configured to receive the first downstream XPIC IF signal and a first upstream XPIC IF signal, respectively;

a first transceiver configured to convert and amplify the first downstream XPIC IF signal into a first 60 GHz RF signal; and a first 60 GHz antenna configured to transmit the first 60 GHz RF signal; and a second radio unit comprising:

a second 60 GHz antenna configured to receive the first 60 GHz RF signal;

a second transceiver configured to amplify the first 60 GHz RF signal, and convert the first 60 GHz RF signal into a second upstream XPIC IF signal;

a second demodulator configured to receive the second upstream XPIC IF signal and a second downstream XPIC IF signal, respectively; and a second receiver configured to receive the second downstream XPIC IF signal from a second duplexer, wherein the first radio unit and the second radio unit are, respectively, coupled to the antenna coupling unit.

8. The all outdoor radios system of claim 7, wherein:

the second transceiver is further configured to convert the second downstream XPIC IF signal into a second 60 GHz RF signal, and amplify the second 60 GHz RF signal;

the second 60 GHz antenna is further configured to transmit the second 60 GHz RF signal;

the first 60 GHz antenna is further configured to receive the second 60 GHz RF signal; and the first transceiver is further configured to amplify the second 60 GHz RF signal, and convert the second 60 GHz RF signal into the first upstream XPIC IF signal.

9. The all outdoor radios system of claim 7, wherein:

the first downstream XPIC IF signal and the second downstream XPIC IF signal are configured to use different carrier frequencies within the license-free 60 GHz band.

10. The all outdoor radios system of claim 7, wherein:
the first radio unit is configured to use vertical polarization of the antenna coupling unit, and the second radio unit is configured to use horizontal polarization of the antenna coupling unit.

11. The all outdoor radios system of claim 10, wherein:
the first demodulator of the first radio unit is further configured to cancel interference of the horizontal polarization in the first downstream XPIC IF signal using the first upstream XPIC IF signal.

12. The all outdoor radios system of claim 10, wherein:
the second demodulator of the second radio unit is further configured to cancel interference of the vertical polarization in the second downstream XPIC IF signal using the second upstream XPIC IF signal.

13. The all outdoor radios system of claim 7, wherein the first radio unit and the second radio unit are configured to operate at one selected from the group consisting of a hot standby manner, a space diversity manner, a frequency diversity manner, and a hybrid diversity manner.

14. An all outdoor radios system configured with a protection system and a cross polarization interference cancellation (XPIC) application using a wireless connection operating at a license-free 60 GHz band, comprising:
a first XPIC pair including:
a first antenna coupling unit;
a first radio unit configured to use vertical polarization of the first antenna coupling unit; and
a second radio unit configured to use horizontal polarization of the first antenna coupling unit, wherein the first radio unit and the second radio unit are, respectively, coupled to the first antenna coupling unit; and
a second XPIC pair including:
a second antenna coupling unit;
a third radio unit configured to use vertical polarization of the second antenna coupling unit; and
a fourth radio unit configured to use horizontal polarization of the second antenna coupling unit, wherein the third radio unit and the fourth radio unit are, respectively, coupled to the second antenna coupling unit;
wherein each of the first radio unit, the second radio unit, the third radio unit, and the fourth radio unit includes:
a duplexer;
a receiver configured to receive a downstream XPIC IF signal from the duplexer;
a demodulator configured to receive the downstream XPIC IF signal and an upstream XPIC IF signal, and cancel interference of an opposite polarization in the downstream XPIC IF signal using the upstream XPIC IF signal;
a protection interface configured to receive a downstream protection digital signal;
a wireless controller configured to encapsulate the downstream protection digital signal into a downstream protection digital packet addressed to a destination radio unit;
a modem configured to convert the downstream protection digital packet into a downstream protection IF signal;
an IF combiner configured to combine the downstream XPIC IF signal and the downstream protection IF signal, and generate a downstream combined IF signal;
an IF splitter configured to receive an upstream combined IF signal, and extract the upstream XPIC IF signal and an upstream protection IF signal from the upstream combined IF signal, respectively;
a transceiver configured to convert and amplify the downstream combined IF signal into a downstream 60 GHz RF signal; and
a 60 GHz antenna configured to transmit the downstream 60 GHz RF signal.

15. The all outdoor radios system of claim 14, wherein:
the 60 GHz antenna is further configured to receive an upstream 60 GHz RF signal;
the transceiver is further configured to amply the upstream 60 GHz RF signal, and convert the upstream 60 GHz RF signal into the upstream combined IF signal;
the modem is further configured to convert the upstream protection IF signal into the upstream protection digital packet;
the wireless controller is further configured to decapsulate the upstream protection digital packets, accept the upstream protection digital packet addressed to the destination radio unit that includes the wireless controller, and convert the accepted upstream protection digital packet into the upstream protection digital signal; and
the protection interface is further configured to receive the upstream protection digital signal.

16. The all outdoor radios system of claim 14, wherein:
the first radio unit and the third radio unit are configured to operate as a vertical polarization protection pair, and
the second radio unit and the fourth radio unit configured to operate as a horizontal polarization protection pair.

17. The all outdoor radios system of claim 16, wherein:
a protection interconnection within any one of the vertical polarization protection pair and the horizontal polarization protection pair and an XPIC interconnection within any one of the first XPIC pair and the second XPIC pair are configured to use different channels allocated within the license-free 60 GHz band.

18. The all outdoor radios system of claim 14, wherein the first radio unit and the second radio unit are configured to operate at one selected from the group consisting of a hot standby manner, a space diversity manner, a frequency diversity manner, and a hybrid diversity manner.

* * * * *